US007430713B2

(12) United States Patent
Kobashi et al.

(10) Patent No.: US 7,430,713 B2
(45) Date of Patent: Sep. 30, 2008

(54) LAYOUT ADJUSTMENT METHOD AND APPARATUS AND LAYOUT ADJUSTMENT PROGRAM

(75) Inventors: Kazafumi Kobashi, Yokohama (JP); Kanta Hara, Kawasaki (JP); Jun Makino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 520 days.

(21) Appl. No.: 11/038,237

(22) Filed: Jan. 21, 2005

(65) Prior Publication Data
US 2005/0172224 A1 Aug. 4, 2005

(30) Foreign Application Priority Data
Jan. 30, 2004 (JP) ............... 2004-024487

(51) Int. Cl.
*G06F 17/00* (2006.01)
(52) U.S. Cl. ...................... 715/244; 715/247
(58) Field of Classification Search ............... 715/500, 715/517, 518, 521, 244, 243, 247
See application file for complete search history.

(56) References Cited

U.S. PATENT DOCUMENTS

| | | | | |
|---|---|---|---|---|
| 5,214,755 A | 5/1993 | Mason | ............... | 395/147 |
| 5,745,122 A | 4/1998 | Gay et al. | ............... | 345/433 |
| 5,796,401 A | 8/1998 | Winer | ............... | 345/433 |
| 5,845,303 A | 12/1998 | Templeman | ............... | 707/517 |
| 5,953,733 A | 9/1999 | Langford-Wilson | ............... | 707/517 |
| 5,963,203 A * | 10/1999 | Goldberg et al. | ............... | 715/723 |

(Continued)

FOREIGN PATENT DOCUMENTS

JP 6-251117 9/1994

(Continued)

OTHER PUBLICATIONS

Rosenfeld, Binyamin, et al, "Information Extraction and Text Segmentation: Structural Extraction From Visual Layout of Documents", Proceedings of the Eleventh International Conference on Information and Knowledge Management CIKM '02, Nov. 2002, pp. 203-210.*

(Continued)

*Primary Examiner*—Laurie Ries
(74) *Attorney, Agent, or Firm*—Fitzpatrick, Cella, Harper & Scinto

(57) ABSTRACT

This invention provides a layout adjustment method of determining the layout of a page on the basis of layout information representing the intra-page layout of a plurality of partial regions in which images based on assigned data are visually drawn. In the layout adjustment method, the layout information contains, for a region set in which a plurality of partial regions arrayed in a predetermined directions are grouped, the total size in the predetermined direction and the flexible range of the distance between the partial regions. The layout information and data corresponding to each partial region are acquired from a memory. For each of the plurality of partial regions included in the region set, a size suitable for drawing the assigned data is calculated. At least the distance between the partial regions is changed within the flexible range on the basis of the total size and the calculated size of each partial region, thereby adjusting the layout of the region set.

12 Claims, 21 Drawing Sheets

U.S. PATENT DOCUMENTS

| | | | |
|---|---|---|---|
| 6,573,907 B1* | 6/2003 | Madrane | 715/719 |
| 7,028,255 B1* | 4/2006 | Ayers | 715/517 |
| 7,200,810 B2 | 4/2007 | Nitta et al. | |
| 2002/0140982 A1 | 10/2002 | Nitta et al. | |
| 2003/0079177 A1 | 4/2003 | Brintzenhofe et al. | 715/500 |

FOREIGN PATENT DOCUMENTS

| | | |
|---|---|---|
| JP | 7-129658 | 5/1995 |
| JP | 8-044883 | 2/1996 |
| JP | 9-146948 | 6/1997 |
| JP | 2002-297572 | 10/2002 |
| WO | WO 01/39019 | 11/2000 |

OTHER PUBLICATIONS

Cruz, Isabel F., et al, "Publication and Customization of Electronic Documents Using PANDA", Proceedings of the 17th Annual International Conference on Computer Documentation SIGDOC '99, Oct. 1999, pp. 58-64.*

Co-pending U.S. Appl. No. 11/045,946, filed Jan. 28, 2005.

Co-pending U.S. Appl. No. 11/045,776, filed Jan. 28, 2005.

Co-pending U.S. Appl. No. 11/041,742, filed Jan. 25, 2005.

Lok, Simon et al., "A Survey of Automated Layout Techniques for Information Presentations", International Symposium on Smart Graphics, XP002346382, pp. 1-8.

Office Action, dated Jun. 30, 2008, in JP 2004-024487.

* cited by examiner

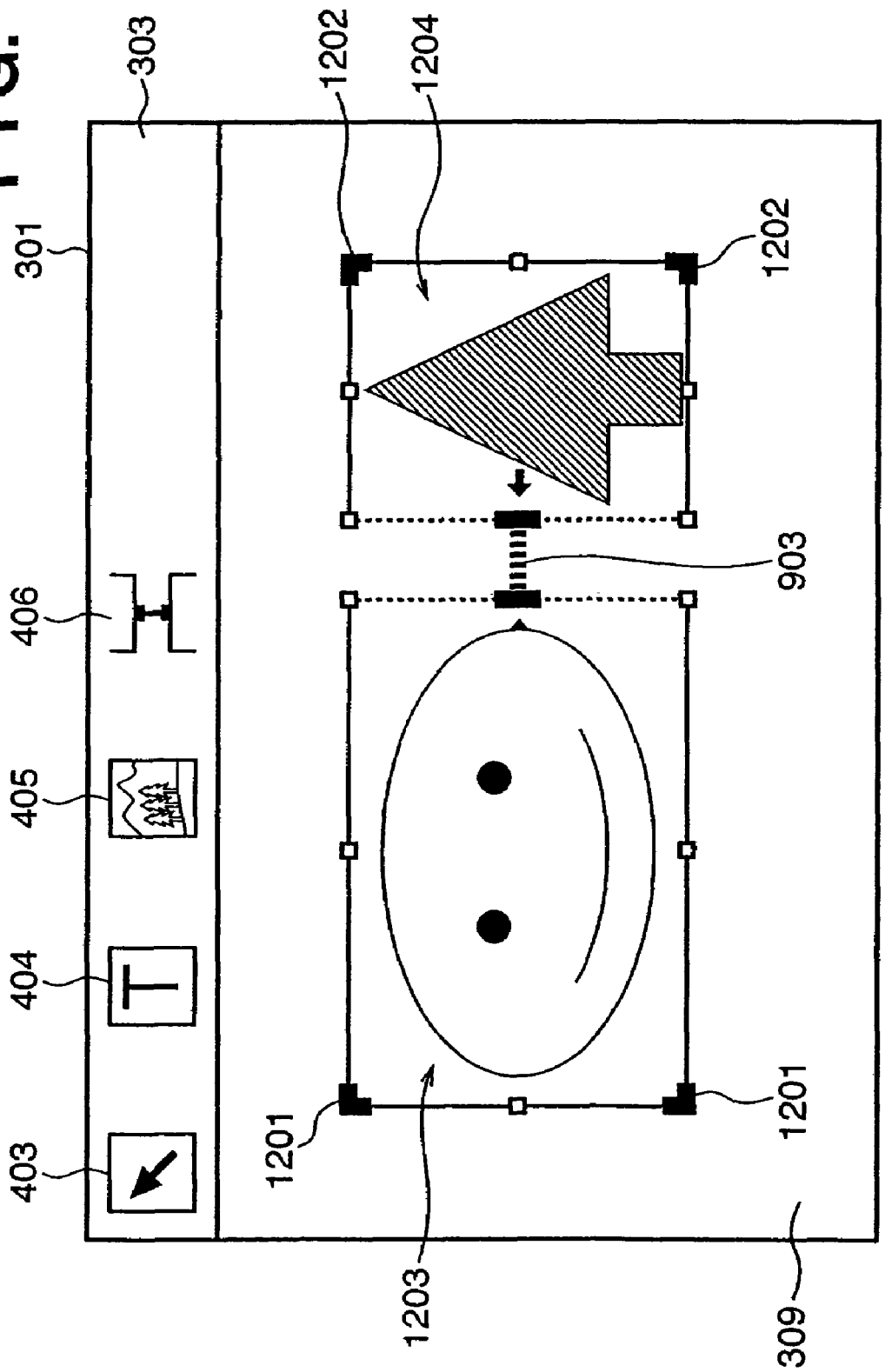

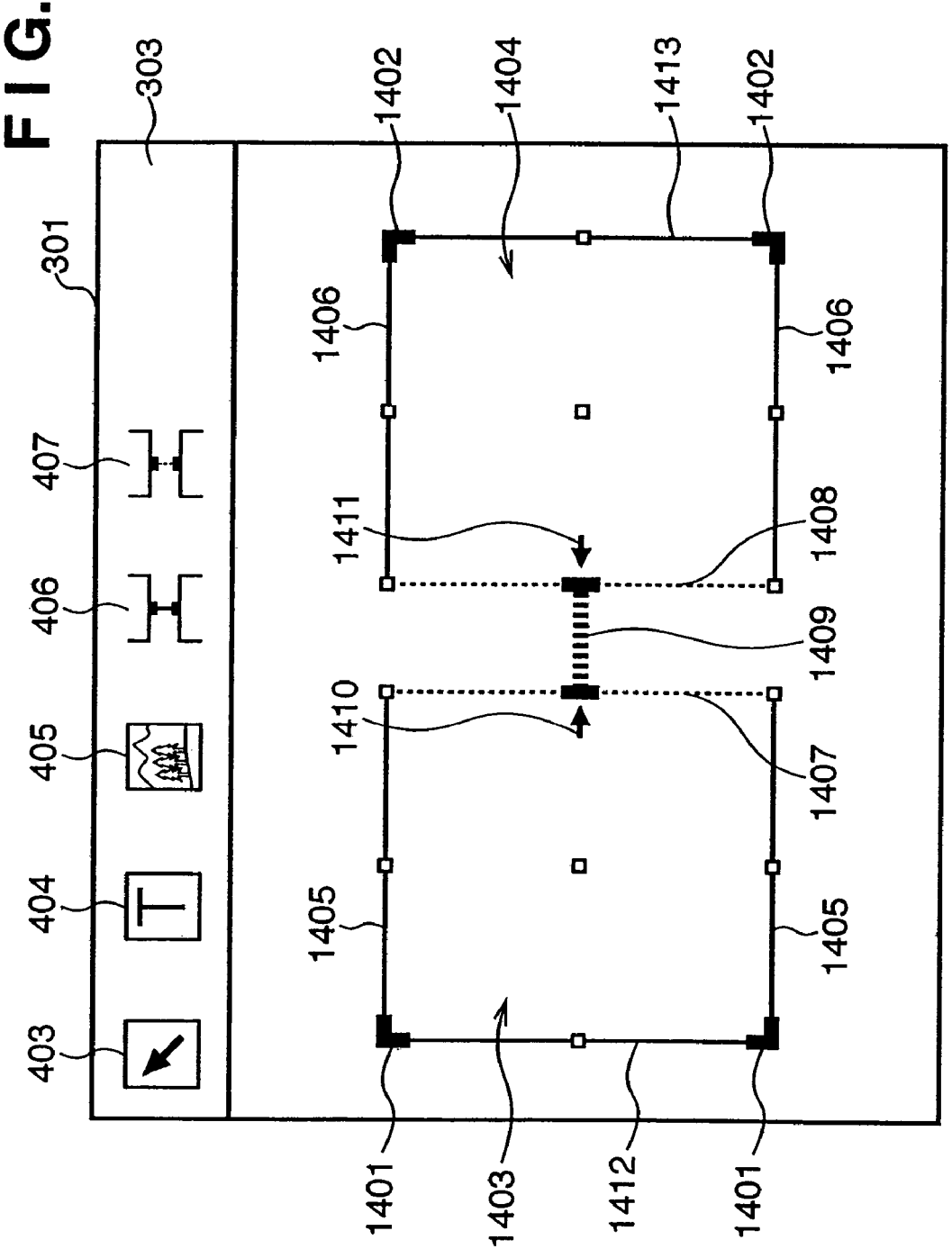

LAYOUT ADJUSTMENT METHOD AND APPARATUS AND LAYOUT ADJUSTMENT PROGRAM

FIELD OF THE INVENTION

The present invention relates to a technique of generating, editing, and printing a document containing texts and images and, more particularly, to generation, editing, and printing of a variable data document.

BACKGROUND OF THE INVENTION

Since the merchandise service life decreases recently due to a variety of merchandise items, and the number of consumers with customization service orientation increases along with the penetration of the Internet, the necessity of CRM (Customer Relationship Management) and one-to-one marketing has received a great deal of attention. These methods are very effective for purposes of increasing the customer satisfaction and winning and networking new customers.

The one-to-one marketing is a kind of database marketing. Personal attribute information such as the age, sex, hobby, taste, and purchase log of each customer is stored as a database. The contents of the information are analyzed, and a proposal that meets customer's needs is presented. A typical method is variable print. Especially, along with the recent progress in DTP (DeskTop Publishing) technology and the spread of digital printers, variable print systems have been developed, which customize and output a document for each customer. Such a variable print system is required to create a customized document in which contents in quantity that changes for each customer are laid out in an optimum manner.

Generally, when such a customized document is to be created by a variable print system, containers are laid out on the document. A container indicates a partial region to draw a content (drawing content) and is sometimes called a field region. More specifically, containers are laid out on the document, and a database and the layout are associated with each other (each content in the database is associated with each container). With this operation, a customized document (document) is created. In this specification, such a document will be referred to as a variable data document.

In the variable print system, a content which is different for each customer can be inserted in each of the containers laid out. The size of data to be inserted in a content is flexible. If the size of a container is fixed, the following problem arises. For example, when text data having a size larger than the container size is inserted, the text cannot wholly be displayed in the container. Alternatively, when image data having a size larger than the container size is inserted, the image is partially missing. Such a problem is called overflow.

If the content is image data, the image may be reduced and drawn in the container. However, the image may be excessively small. There is also proposed a technique in which if text data whose size is larger than a fixed container size is inserted, the font size of the text is reduced to display the entire text in the container. However, if the font size is adjusted, it may be too small to balance the whole document, or the document may become difficult to read.

The "layout design apparatus" of Japanese Patent Laid-Open No. 7-129658 discloses an automatic layout technique to solve the above-described problems. In this technique, when the size of a container becomes large, the size of an adjacent container is reduced to maintain the interval between them.

In Japanese Patent Laid-Open No. 7-129658, however, the interval between adjacent containers is fixed. In this specification, association between adjacent containers will be referred to as a link. The interval (distance) between the adjacent containers will be referred to as the length of the link. Assume that a link is set between containers, and the length of the link is fixed, as in Japanese Patent Laid-Open No. 7-129658. In this case, even when both containers are to be enlarged to optimum sizes, it may be impossible to enlarge them to ideal sizes because of the fixed length of the link between the containers. The link aims at preventing the containers from overlapping when they are enlarged to optimum sizes corresponding to the inserted data amounts. However, the length of the link is fixed. For this reason, even when containers A and B, which have a link therebetween, are to be enlarged to optimum sizes, the length of the link always exists between the containers A and B. Hence, enlargement of the containers A and B is inhibited to some extent because of the relationship to the size of the page area in which the containers A and B are laid out.

Conversely, assume that the data amounts inserted in the containers are small. Since the distance between the containers A and B is kept constant because of the link with the fixed size, reduction of the containers A and B is limited, and the container sizes may be larger than necessary. That is, the container size cannot be optimized. To keep a ratio due to the presence of an image, it may be enlarged carelessly. In addition, if, e.g. a text having a smaller size than the container size is inserted (the number of characters is smaller than expected), the characters may be laid out in a small region as compared to the container region. In this case, the container has a blank, and the layout is not great-looking.

As described above, a user may expect automatic layout in which priority is given to making containers having optimum sizes, and the length of the link between the containers decreases or increases to some degree. However, the prior art which uses the fixed link length cannot implement the automatic layout.

SUMMARY OF THE INVENTION

The present invention has been made in consideration of the above problems, and has as its object to implement automatic layout adjustment in which the distance (link length) between partial regions (containers) to display an image based on assigned data is flexibly changed to appropriately change the size of each partial region in accordance with the amount of data inserted at different times.

According to one aspect of the present invention, there is provided a layout adjustment method of determining a layout of a page, comprising: a partial region setting step of setting a basic pattern of a size and position of a partial region in which data is to be inserted; a basic layout step of determining a basic layout by laying out, in the page, a plurality of partial regions set in the partial region setting step; a link setting step of setting a link between partial regions set in the partial region setting step, the link indicating a flexible range of a distance between the partial regions; a calculation step of calculating, for each partial region, a size suitable for drawing the data to be inserted on the basis of the size of the partial region set in the partial region setting step and the data to be inserted in the partial region; and an adjustment step of adjusting the layout in the page by changing the distance between the partial regions within the flexible range set in the link setting step on the basis of the size of each partial region calculated in the calculation step and the basic layout determined in the basic layout step.

Also, according to another aspect of the present invention, there is provided a layout adjustment apparatus for determining a layout of a page, comprising: a partial region setting unit configured to set a basic pattern of a size and position of a partial region in which data is to be inserted; a basic layout unit configured to determine a basic layout by laying out, in the page, a plurality of partial regions set by the partial region setting unit; a link setting configured to set a link between the partial regions set by the partial region setting unit, the link indicating a flexible range of a distance between the partial regions; a calculation unit configured to calculate, for each partial region, a size suitable for drawing the data to be inserted on the basis of the size of the partial region set by the partial region setting unit and the data to be inserted in the partial region; and an adjustment unit configured to adjust the layout in the page by changing the distance between the partial regions within the flexible range set by the link setting unit on the basis of the size of each partial region calculated by the calculation unit and the basic layout determined by the basic layout unit.

According to the present invention, the distance (link length) between partial regions (containers) to display images based on assigned data can flexibly be changed. Hence, automatic layout adjustment can be implemented so that each partial region can ensure an appropriate size in accordance with the amount of data to be inserted at different times.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 20 is a view showing an example of a layout result by a flexible link; and

FIG. 21 is a view showing container layout by a flexible link tool according to another embodiment.

DETAILED DESCRIPTION OF THE PREFERRED EMBODIMENTS

Preferred embodiments of the present invention will now be described in detail in accordance with the accompanying drawings.

First Embodiment

<System Arrangement>

Figure 1:
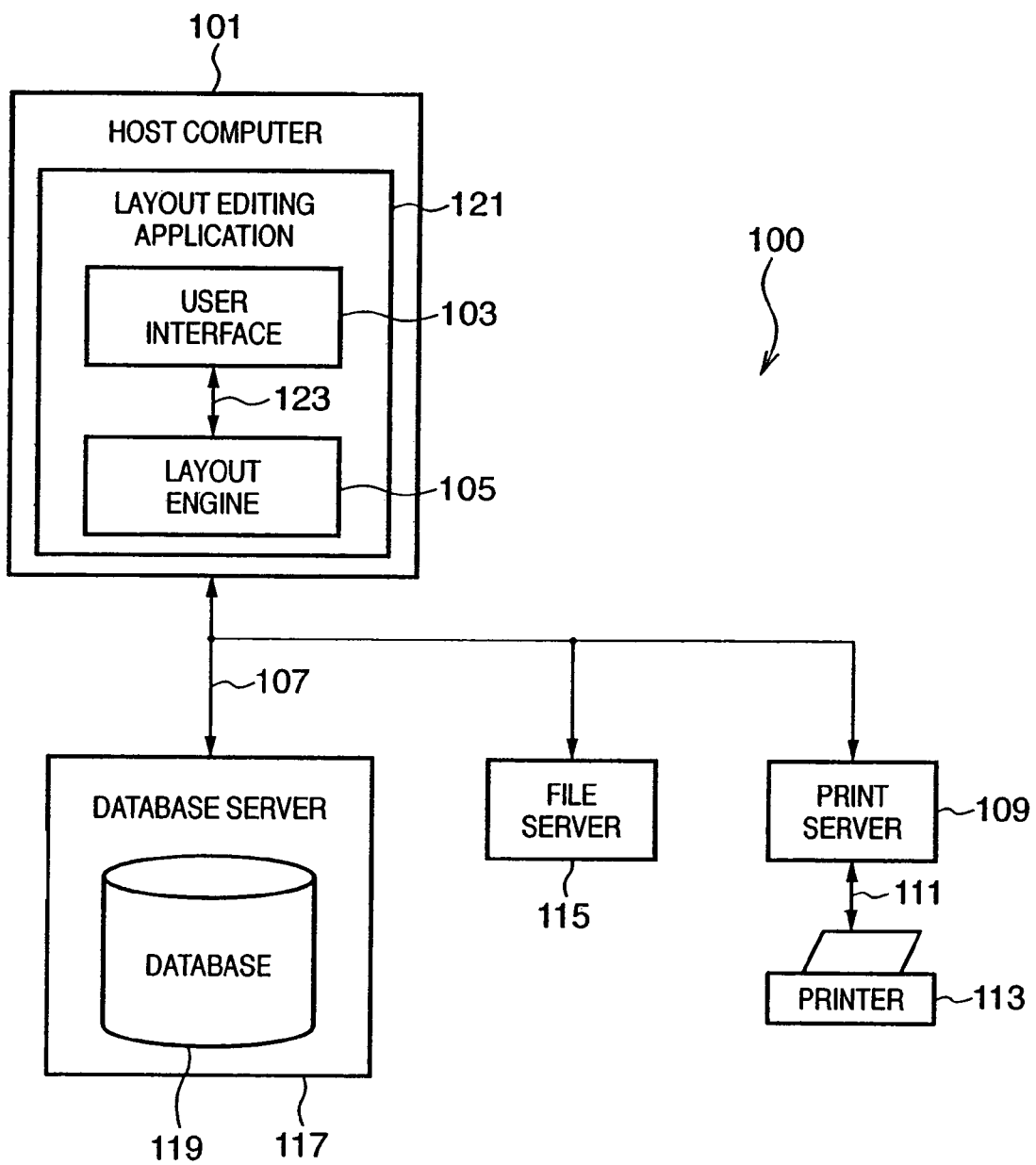
FIG. 1 is a block diagram showing an arrangement of a variable print system according to an embodiment.
Figure 2:
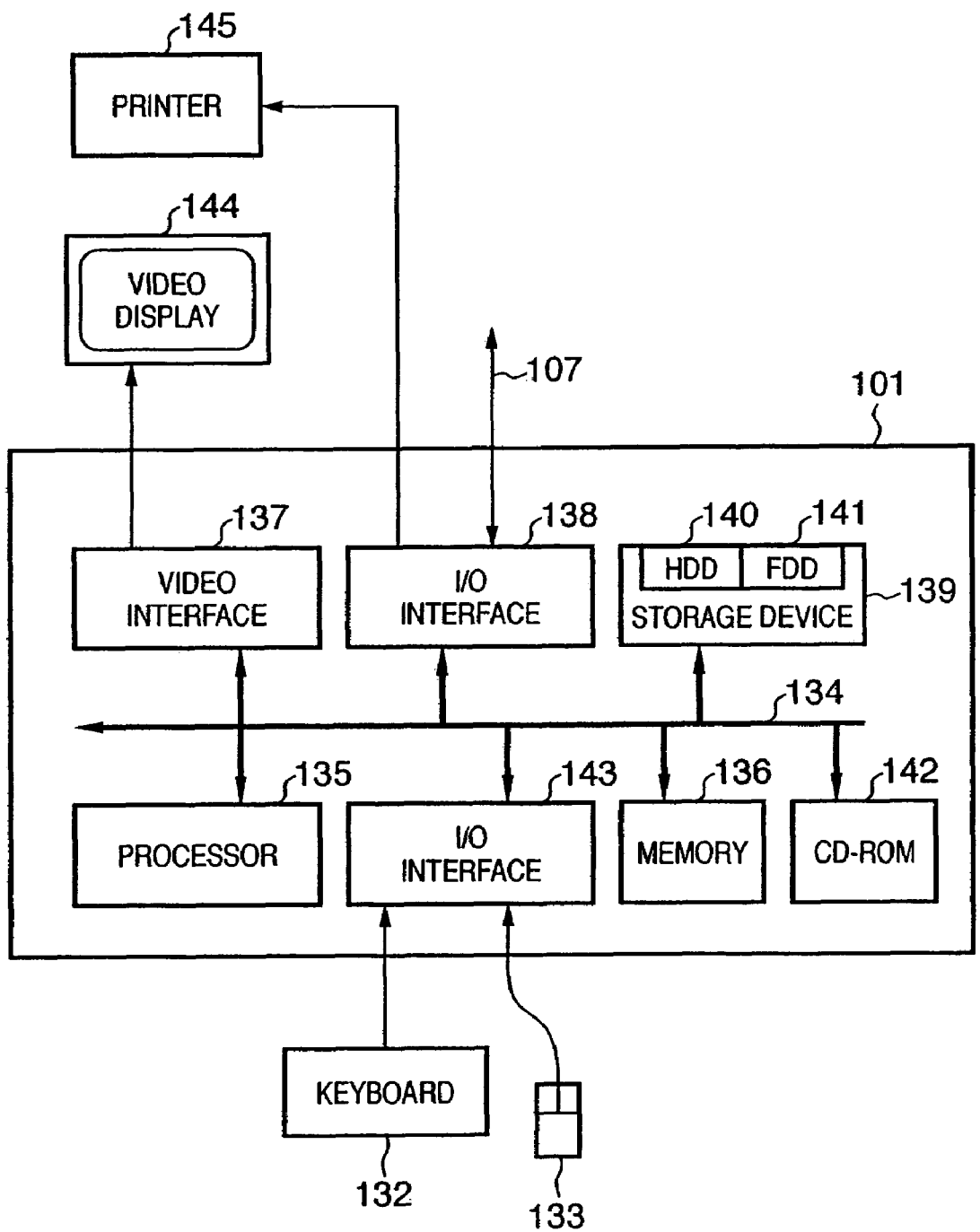
FIG. 2 is a block diagram showing the schematic arrangement of a host computer shown in FIG. 1.

The arrangement of a variable print system according to the embodiment will be described first with reference to FIGS. 1 and 2. FIG. 1 is a block diagram showing an arrangement of a variable print system 100 to print a variable data document. FIG. 2 is a block diagram showing the arrangement of a host computer 101 shown in FIG. 1 in more detail. Variable print processing to be described in this embodiment is executed by the host computer 101 (including general-purpose computer modules) serving as a layout adjustment apparatus. The software of a layout editing application program 121 (layout adjustment program according to the present invention) executable on the system 100 is wholly or partially executed by the host computer 101. Especially, processing for layout editing or processing for printing a variable data document is implemented by the software executed by the host computer 101.

The layout editing application program 121 is stored in a computer-readable medium. The layout editing application program 121 is loaded from the computer-readable medium to a memory 136 of the host computer 101 and executed. The computer-readable medium which stores such software or computer program is a computer program product. When the computer program product is used by a computer, an apparatus suitable for layout editing or variable print of a document is provided.

As shown in FIG. 2, a keyboard 132 and a pointing devices such as a mouse 133 or the like serving as input devices are connected to the host computer 101 through an input/output interface 143. A display device 144 serving as an output device is connected through a video interface 137. A local printer 145 or the like may be connected through an input/output interface 138. The input/output interface 138 also has a function of connecting the host computer 101 to a network 107. With this arrangement, the host computer 101 can be connected to another computer apparatus in the system 100 through the network. Typical examples of the network 107 are a local area network (LAN) and wide area network (WAN).

As shown in FIG. 2, the host computer 101 includes at least one processor unit 135 and the memory unit 136 including, e.g., a semiconductor random access memory (RAM) and read-only memory (ROM). A storage device 139 includes a hard disk drive 140 and floppy (registered trademark) disk drive 141 capable of transmitting/receiving data to/from the computer-readable medium which stores the program. Although not illustrated in FIG. 2, a magnetic tape drive can also be used as the storage device 139. A CD-ROM drive 142 is provided as a nonvolatile data source (the computer program may be provided by a CD-ROM, as a matter of course).

Typically, the host computer 101 uses the components 135 to 143 of the computer modules communicating through an interconnection bus 134 in a form according to an operating system such as GNU/LINUX or Microsoft Windows (registered trademark) or by a method by the conventional operation mode of a computer system known in an associated technique. That is, the above-described components 135 to 143 are communicably connected through the bus 134 and used by the operating system installed in the host computer 101.

Examples of the host computer 101 shown in FIG. 2 are an IBM-compatible PC or Sparcstation available from SUN, or a computer system including them.

<Outline of Layout Editing Application>

In this embodiment, the layout editing application program 121 is resident in the hard disk drive 140, and its execution or load is controlled by the processor 135. The hard disk drive 140 and semiconductor memory 136 are used to store the program of the layout editing application 121 and data fetched from the network 107.

As an example, the encoded program of the layout editing application program 121 is stored in a CD-ROM or floppy (registered trademark) disk, loaded through the corresponding drive 142 or 141, and installed in the hard disk drive 140. As another example, the layout editing application program 121 may be loaded from the network 107 into the host computer 101 and installed in the hard disk drive 140. The software may be loaded in the host computer 101 by using a magnetic tape, ROM, integrated circuit, magnetooptical disk, wireless communication using infrared rays between the host computer 101 and another device, a computer-readable card such as a PCMCIA card, or email communication with another appropriate computer on a WEB site including the Internet or an intranet. These are examples of computer-readable media. Any other computer-readable medium may be used.

Referring to FIG. 1, the layout editing application 121 of this embodiment causes the computer to execute variable print (also called variable data print (VDP)) and includes two software components, i.e., a layout engine 105 and user interface 103. The layout engine 105 is a software component which loads each record of variable data stored in a database 119 in accordance with the constraints of the sizes and positions given to containers (rectangular ranges) as partial regions and calculates, on the basis of the loaded data and the constraints of the containers, the size and position of each container in which the loaded data should be inserted. In this embodiment, the layout engine 105 also executes processing of drawing data assigned to a container to generate an image of a variable data document. However, the present invention is not limited to this. The layout engine 105 may run as an application to determine the size and position of each partial region (container) and output drawing information to a printer driver (not shown). Accordingly, the printer driver may execute image drawing processing of a variable data document and generate print data. The user interface 103 allows a user to set the layout and attribute of each container and causes him/her to create a document template. In addition, the user interface 103 provides a mechanism to associate each container in the document template with a data source. The user interface 103 and layout engine 105 communicate with each other through a communication channel 123.

Figure 3:
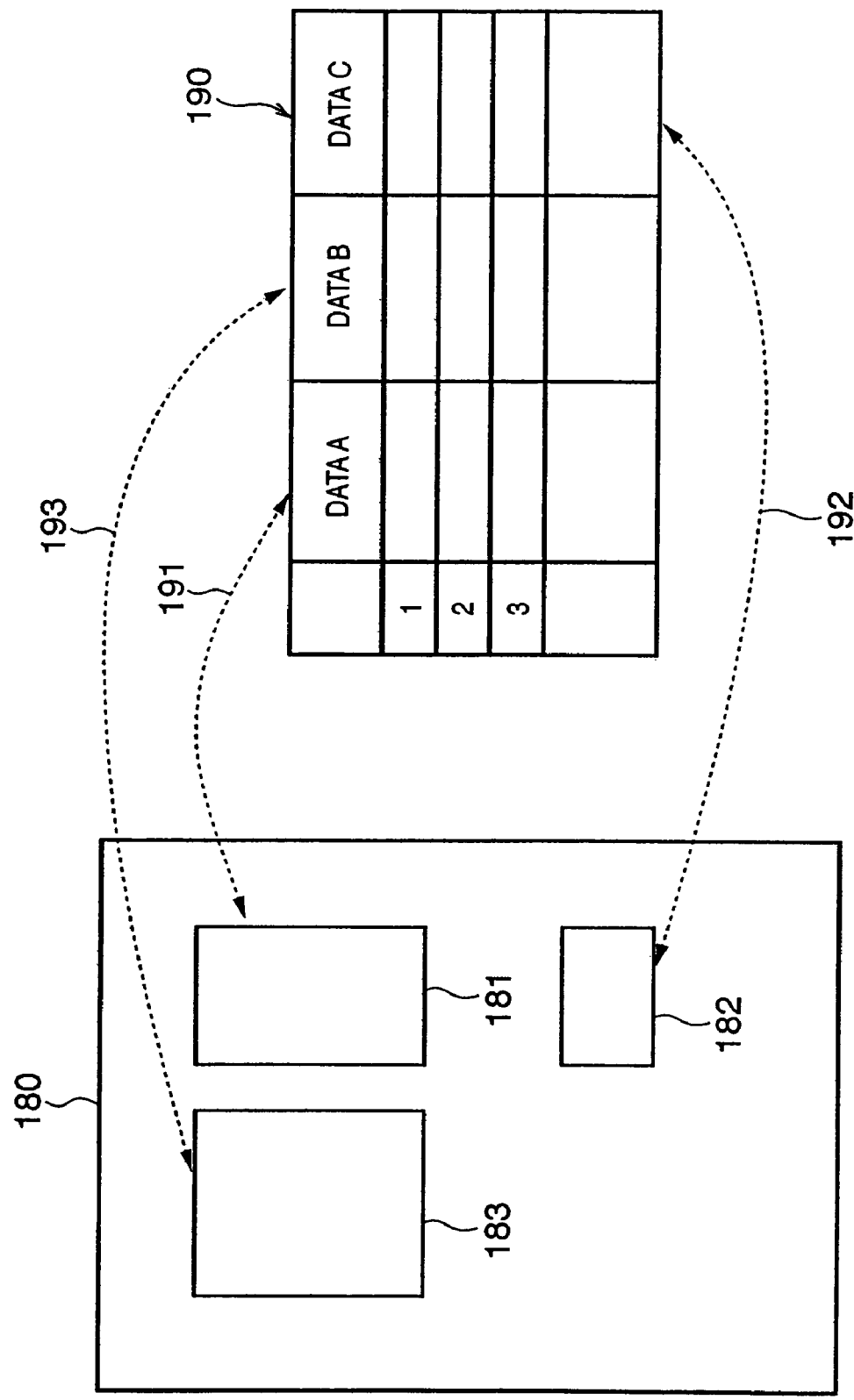
FIG. 3 is a view for explaining the outline of variable data print.

FIG. 3 is a view for explaining the outline of variable data print according to this embodiment. A plurality of containers 181 to 183 are laid out on a page in accordance with an operation instruction from the user through the user interface module 103 (to be referred to as the user interface 103 hereinafter) of the layout editing application 121. Then, constraints about the position and size are given to each container, thereby generating a document template 180. The user interface 103 also associates the document template 180 with a data source 190 and each container with a data field in the data source 190. The association information representing the association between each container and a data field in the data source 190 is described in the document template. The document template is stored in the HDD 140. The data source 190 is a file in which item data is described for each record. The data source 190 is stored in the HDD 140. In accordance with a print instruction or preview instruction from the user, the layout engine 105 loads the data associated by the association information from the data source 190, inserts the data in the containers 181 to 183 of the document template for each record (for example, data fields A to C of data record 1 are inserted in the containers 181 to 183), and adjusts the size of each container in accordance with the inserted data (layout adjustment). When a preview instruction is input, a layout-adjusted document image is generated and output so that the image is displayed on the screen of the video display 144 as a preview. When a print instruction is input, a document image generated by using the layout engine 105 or printer driver is output to the print server 109 as print data. Variable data print is implemented by sequentially processing data records 1, 2, 3, . . .

The data source (190) for document generation may be, e.g., the general database 119 on a database server 117 formed by another computer on which the database application is executed. In this case, the host computer 101 can acquire the data source by communicating with the database server 117 through the network 107. The document template (180) for variable data print, which is generated by the layout editing application 121, is stored in the host computer 101 or a file server 115 formed by another computer. As described above with reference to FIG. 3, the layout engine 105 of the layout editing application 121 generates a variable data document containing a document template merged with data. The document is stored in the local file system of the host computer 101 or in the file server 115, or transmitted to and printed by a printer 113. The print server 109 is a computer to provide a network function to a printer which is not connected directly to the network. The print server 109 and printer 113 are connected through a general communication channel 111.

<Another System Arrangement>

Figure 4:
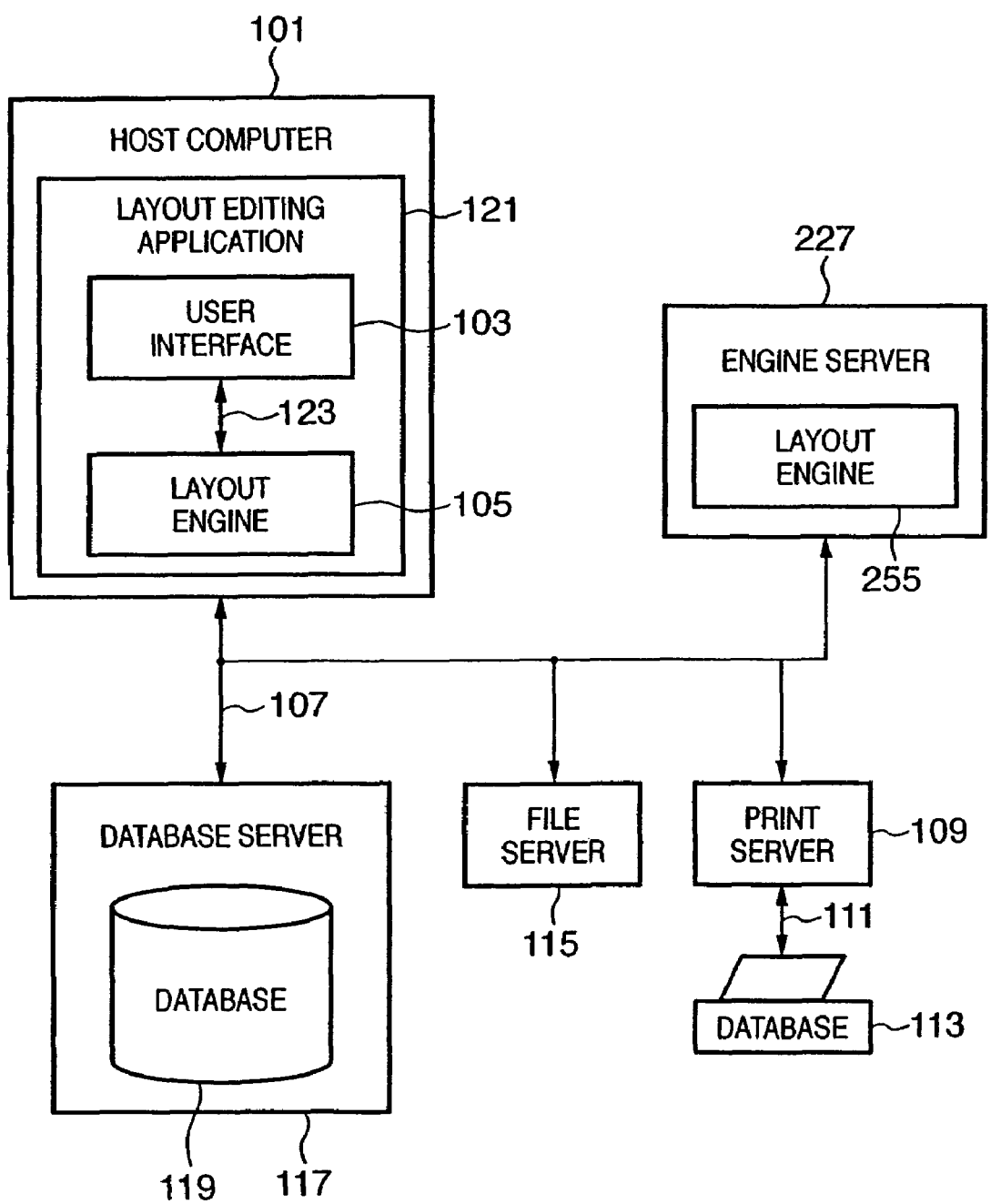
FIG. 4 is a block diagram showing another arrangement of the variable print system according to the embodiment.

FIG. 4 is a block diagram similar to FIG. 1. An engine server 227 is added. A layout engine 225 stored in the engine server 227 is a separate version of the layout engine 105. As the engine server 227, a general computer is used. The layout engine 225 combines a document template stored in the file server 115 with data stored in the database 119 to generate a variable data document for printing or another purpose. This operation is requested through the user interface 103.

<Description of Layout Editing Application>

The layout editing application 121 will be described below.

[Main Window]

Figure 5:
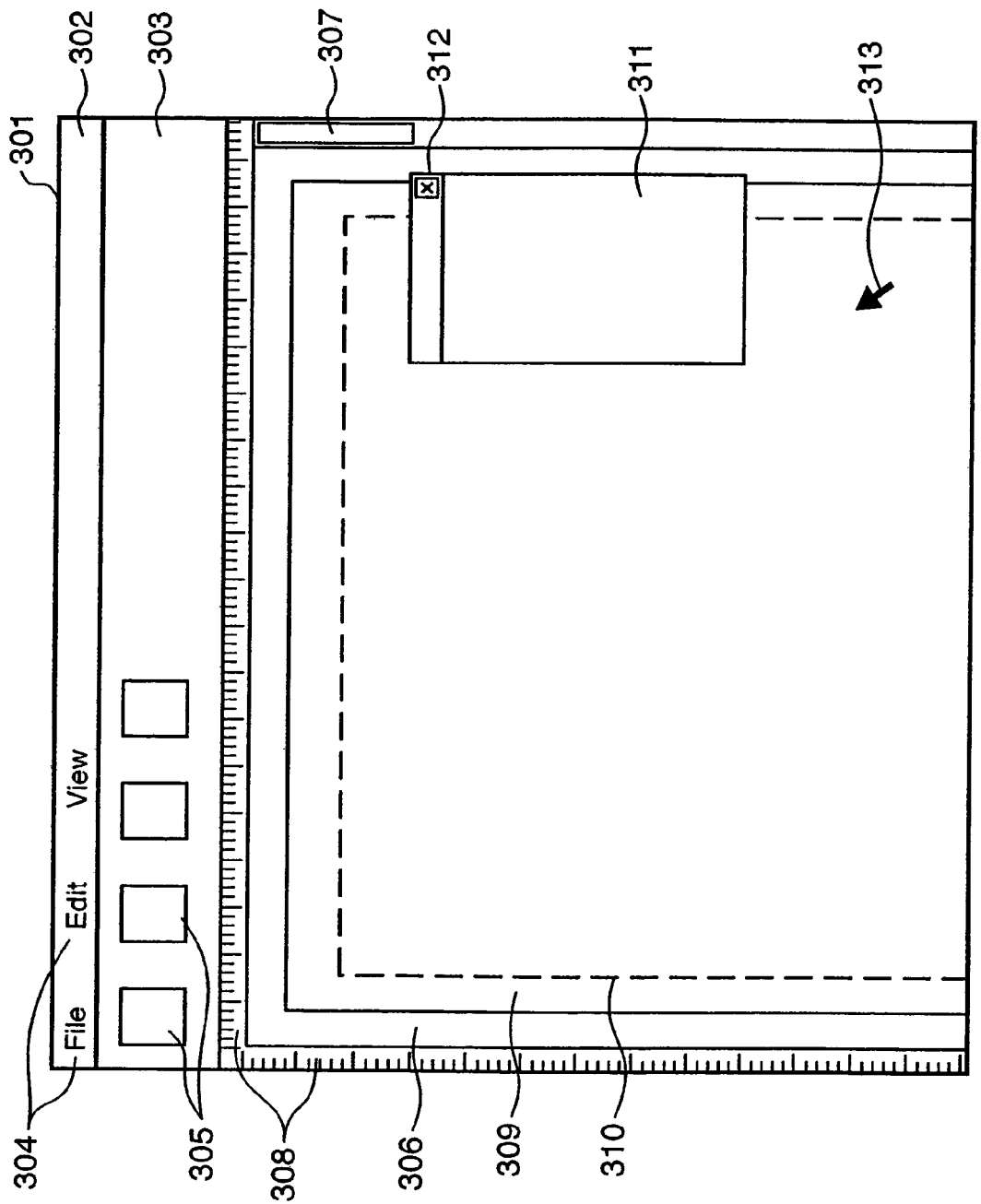
FIG. 5 is a view showing an example of a user interface according to the embodiment, which includes a menu bar, tool bar, work area, and floating palette.

At the time of operation, the user interface 103 causes the video display 144 to display a user interface window formed by an application window 301 shown in FIG. 5. The window 301 has a menu bar 302, tool bar 303, work area 306, and optional palette 311. The menu bar 302 and tool bar 303 can be set in a non-display state or moved to various positions on the screen. The position of the work area 306 can be moved by operating the mouse 133. The palette 311 is an option. A cursor/pointer device 313 represents a position indicated by the mouse 133.

The menu bar 302 as a known technique has a number of menu items 304 extended under the layer of menu options.

The tool bar 303 has a number of tool buttons and widgets 305 which can be set in a non-display state or display state by a special mode of the application.

A ruler 308 is an option and is used to indicate the position of a pointer, page, line, margin guide, container, or object in the work area.

The palette 311 is used to access an additional function such as a variable data library. The palette 311 has a window control 312 to move, resize, or close it. The palette 311 can optionally be displayed on the foreground of the work area or hidden behind an object. The palette 311 can be displayed only within the application window 301 or can partially or wholly be displayed outside the application window 301.

Figure 6:
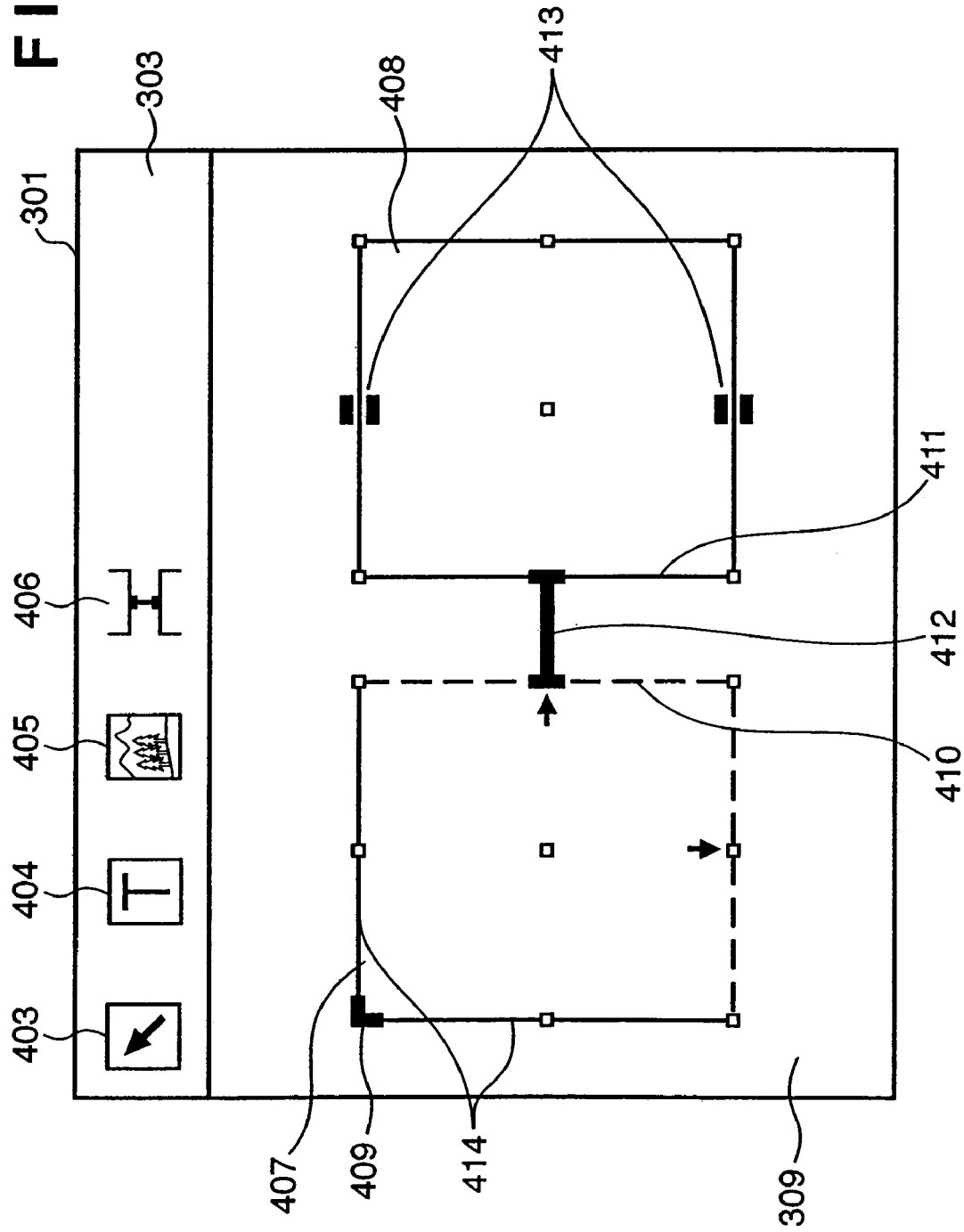
FIG. 6 is a view showing a display example of containers in the user interface.

User-selectable "buttons" as shown in FIG. 6 are laid out on the tool bar 303.

(1) Select tool button 403: This button is used for side selection, movement, size change, resize, or lock/unlock of a container. A container is selected by dragging a select box around the container. When a plurality of containers are selected while keeping the CTRL key pressed, the plurality of containers can be selected.

(2) Text container tool button 404: This button is used to create a container having a static or variable text.

(3) Image container tool button 405: This button is used to create a container having a static or variable image.

(4) Link tool button 406: This button is used to create a link to associate containers with each other. This button is also used to control the distance of the link.

In the application window 301 of the layout editing application 121 shown in FIG. 5, when containers and links are laid out in a page, a basic layout can be determined. The basic layout is a layout as a base of variable data print. When all containers in the basic layout are fixed containers, all record print results have the same layout. When containers in the basic layout are flexible containers, the size or position of each container varies within the constraint range (to be described later) in accordance with the amount or size of data inserted for each record. The document template created by the layout editing application 121 is strictly used to determine the basic layout. When a flexible container is included, the final layout of a printed product is adjusted in accordance with loaded data.

[Document Template]

Referring to FIG. 5, the work area 306 is used to display and edit the design of the document template (180: basic layout). The outline of a document to be printed can be presented to the user in the process of causing him/her to design the document template. Accordingly, the user can easily understand how the document merged with the data source (190) changes on the basis of the amount and size of variable data.

When the data source is associated with the document template, a corresponding variable text or image is displayed in each container laid out so that a preview of the current document can be obtained.

In the document template creation mode, visual keys (e.g., frame lines of containers, anchors, sliders, and links) which express the document structure and variable data containers in the document template are always displayed. In the preview mode in which variable data are inserted, the visual keys are displayed when the cursor is moved onto a container, or a container is selected.

The work area 306 includes a scroll bar 307, the optional ruler 308, and a document template 309. The document template 309 can indicate the presence of a plurality of pages. The document template 309 indicates the document template 180 shown in FIG. 3.

The page size of a given document template is designated by the user by using a known technique. For example, "Page Setup" is selected from "File" of the menu to display a dialogue to set the page size, on which the page size designated by the user is reflected. The actual number of pages of each document can change depending on the variable data in the associated data source. This is because when a field like a flexible table whose size is changed in accordance with the amount of variable data is set in the document template, and variable data which cannot be fitted in one page is loaded, an additional page is automatically created.

A border 310 shown in each page is an arbitrary page margin representing the maximum width of an object printable on the page.

FIG. 6 is a view showing examples of objects which can be displayed on the document template 309 of one page. The objects include containers 407 and 408, an arbitrarily applied anchor icon 409, fixed sides 411 and 414, an unfixed side 410, a link 412, and sliders 413. The anchor icon 409 can be set at a corner or side of the rectangle of a container or the center of a container. When the anchor icon 409 is set, the position of the set point is fixed. That is, in the example shown in FIG. 6, the anchor icon 409 is set at the upper left corner of the container 407. When variable data is inserted in the container 407, and the image size or text amount of the variable data is large, the container can be enlarged to the right and lower sides. When the anchor icon 409 is set on a side, the side is fixed. The container can be enlarged in the directions of the three remaining sides. When the anchor icon 409 is set at the center of a container, the central position of the container is fixed. The container can be enlarged in four directions without changing the central position of the rectangle of the container. The link 412 (to be described later in detail) indicates that the containers 407 and 408 are associated with each other. The link 412 indicates that the container 408 can be moved to the right while maintaining the length (the range can be designated) set for the link. The sliders 413 indicate that the container can be moved in parallel to the sides on which the sliders are set.

[Container]

A container will be described. A container is a space (called a partial region) where a fixed or flexible text or image is inserted from a variable data file to the document template and drawn. A container is laid out together with other containers and objects, as shown in FIG. 6. Movement, size adjustment, and re-creation of the container are done by operating the mouse 133 on the basis of an operation instruction from the user through the user interface window.

More exactly, the container has a set of settings, visual expression, interaction, and editing operation. The definition of a container according to this embodiment will be described below.

(1) A container has a fixed or flexible content.

A flexible content can be regarded as dynamic because data acquired from the data source can change for each document, i.e., each record. In this embodiment, however, animated contents and contents which change over time by another method are not assumed as a flexible content because they are not suitable for printing. A fixed content is displayed in a similar manner in all documents generated by using containers. However, when a link is set between a fixed content and a flexible content, the fixed content may be affected by the flexible content and change its position in each document.

(2) A container has ornament functions like text settings such as a background color, border, and font style applied to a content. This setting is called a container attribute. The container attribute can be set for each container. The setting can also be done such that a container has the same container attribute as another container.

(3) A container is merged with data from the data source in generating a document. The ornament function can visually be recognized on a printed output product for all fixed contents. A flexible content provides display of specific data from the data source. This expression of the container can be, e.g., printed or displayed on the screen of the video display 144, or subjected to both printing and display.

(4) A container has a user interface as a visual key, as shown in FIG. 6. A container has, e.g., an interactive graphical user interface (GUI) to edit the container or display settings. Each element of the GUI is displayed on the screen of the video display 144 but not printed in the document. The user interface 103 of the layout editing application 121 has a function of displaying some of the ornament functions of a container such as the background color and font and allowing editing and display of settings of the container.

[Constraints of Container]

Each container has constraints about control for the manner by which contents displayed by the respective documents are combined. These constraints (including combining a fixed or flexible content with a container) are used as a principal method of causing the user to control the generations of a number of documents from one document template. An example of the constraint is "the maximum height of the content of this container is 4 inches". Another example of the constraint is "the left edge of the content of the container must be displayed at the same horizontal position in each document". The contents described here indicate various methods of displaying and editing such constraints by using the GUI.

A content place holder which designates the layout of a fixed content like an image having a defined place on a page is well-known in the digital print technique. Each container has a position and size. The containers are edited and displayed by a method as a known technique. The following description will be made with a focus on display and editing in a method specialized to variable data print.

When containers are used, the user can designate the sizes (drawing sizes) and positions of contents in a document. Since many kinds of documents are generated from one document template, a number of possibilities and constraints are set for the containers. To set (designate) and display them, a predetermined user interface is used.

The sides of one container define the virtual border of an associated content displayed in the document. Hence, discussion about the left side of a container is equivalent to discussion about the leftmost side of an area where an associated content can be displayed in each document. Similarly, discussion about the height of a container can be understood as discussion about the constraint of the height of an associated content in the generated document. In this specification, they are clearly distinguished in discussing the side or size of a container by referring to the user interface 103.

In the following description, the term "fixed", which defines a certain value used to restrict display of a content, applies to all documents in the same way.

(1) When the width of a container is fixed, the width to be assigned to an associated content is the same in all documents.

(2) When the height of a container is fixed, the height to be assigned to an associated content is the same in all documents.

(3) When a distance (link length) is fixed, the designated distance is a constraint in all documents.

(4) When the left and right sides of a container are fixed, the horizontal positions of sides related to the page are the same in all documents. However, the height or vertical position of the container can change. For example, when the left side of a container is fixed, the left side of an associated content is displayed at the same horizontal position in all documents. However, the content may be displayed on the upper side of the page in a document and on the lower side of the page in another document.

(5) When the upper and lower sides of a container are fixed, the vertical positions of sides in the page are the same in all documents. However, the width or horizontal position of the container can change for each document.

(6) The vertical axis of a container is a virtual vertical line which is parallel to the right and left sides of the container and is located at the intermediate position therebetween. When the vertical axis of the container is fixed, the average of the horizontal positions of the left and right sides of the container (i.e., the central position between the left and right sides) is the same in all documents. In this constraint, the width of the container can change. However, the vertical axis is located at the same horizontal position in all of documents independently of whether the left and right sides are closest to or farthest from the vertical axis. Note that the height and vertical position of the container are not affected by this constraint.

(7) Similarly, when the horizontal axis is fixed, the average of the upper and lower sides of a container is located at the same vertical position. However, the width and horizontal position of the container are not affected by this constraint.

(8) When both the horizontal axis and the vertical axis are fixed, the central position of the container is fixed. However, the width and height of the container are not affected by this constraint.

(9) When the courner position of a container, the intermediate position of a side of a container, or the central position of a container is fixed, the position is the same in all documents. For example, when the upper left corner of a container is fixed, the upper left position of the container laid out is the same in all documents.

(10) The vertical sides or vertical axis can be fixed in association with the left or right side of the page, left or right page margin, or another horizontal position. Similarly, the horizontal sides or horizontal axis can be fixed in association with the upper or lower side of the page, upper or lower page margin, or another vertical position.

A term opposite to "fixed" is "flexible" which indicates that a side, axis, corner, or intermediate position of a container or a document constraint can change between documents (between records). For example, in a page, the layout is expected to dynamically change depending on the size or amount of variable data. However, the user may want that the size or position of a specific container is fixed, or the four corners of a container at a corner of the page is fixed. For this purpose, the layout editing application 121 can appropriately set, for each container (partial region), whether to fix or change a side, axis, corner, or intermediate position. Hence, the user can create a desired basic layout in determining the basic layout of the document template 180.

[Display/Editing of Container]

Method of Creating New Container

Containers are described in two types, i.e., text container and image container. A text container has a text and an embedded image. An image container has only an image.

As shown in FIG. 6, a new text container or image container is created on the document template 309 by clicking the mouse 133 on the text container tool 404 or image container tool 405 and dragging a rectangle on the document template 309.

Alternatively, a container may be created by activating the appropriate tool 404 or 405 and simply clicking the mouse on the document template 309. In this case, a container having a default size is inserted on the template in accordance with the click operation of the mouse 133. In addition, a dialogue box or prompt to set the size of the new container is provided. The container size can be set by various methods. For example, the size may be defined automatically in advance, or a container may be created and laid out by a calculated schema. When the generated container is selected by an input means such as the mouse, and its properties are displayed by clicking on the right button of the mouse, the container property dialogue is displayed so that constraints for the container can be set. In the container property dialogue UI (corresponding to a partial region setting means), various kinds of constraints described above can be set. In the container property dialogue, the size (width and height) and position of the container can be set. To set a flexible size, the basic pattern (basic size and reference position) of the container is set. In addition, the maximum container size (width and height) and the minimum container size (width and height) can be set.

[Container Display Method]

FIGS. 7A to 7D show display rules about the sides of a container.

To express the state of a side of a container, the application 121 expresses a side by using a solid line (item 503) or a dotted line (504). In addition, the application 121 uses anchors (line, shape, and icon indicated by 506, 507, and 509 drawn near the sides), handles (control points 502 drawn on or near the sides of the region for movement and correction), sliders (short parallel lines drawn on both sides of a side, 413 in FIG. 6), enlarge/reduce icons (505), and colors.

The rules of the container display method shown in FIGS. 7A to 7D are as follows.

(1) A fixed side is drawn by a solid line.

(2) When the width is fixed, the left and right sides are drawn by solid lines.

(3) When the height is fixed, the upper and lower sides are drawn by solid lines.

(4) The axes are not drawn.

(5) Enlarge/reduce icons are drawn near each of sides which are not drawn according to the rules (1) to (3). The sides are drawn by dotted lines.

(6) When the pair of vertical and horizontal sides or the pair of vertical axis and horizontal axis are fixed, an anchor is drawn at the intersection between them.

(7) When no anchor is drawn anywhere on a fixed side, a slider is drawn at the center of the edge.

(8) When neither anchor nor slider is drawn for the pair of vertical and horizontal sides or the pair of vertical axis and horizontal axis, a handle is drawn at the intersection between them.

The lines defined by the rules (1), (2), and (3) are fixed or restricted, as described above, and drawn by solid lines. Flexible sides defined by the rule (5) are drawn by dotted lines. Anchors are represented at fixed points defined by the rules (6), (7), and (8). Sliders are represented at some fixed sides. Handles are represented at remaining points.

In the above-described rules, higher priority is given to a constraint set by the user later. That is, when another constraint is set later, and it can affect sides which should be drawn in accordance with the above-described rules, the drawing contents of solid line or dotted lines are changed.

The location where a flexible side is drawn depends on the content of that container. As will be described later, "dynamic calibration processing" is used, which indicates that a content is merged with a document template and made visible by the user interface. Another means for determining the layout position of a flexible side in the user interface can be used. For example, the container size averaged in all documents (the content area) is used for determining the layout position of a flexible side in the user interface.

These content expressions provide a graphical means for displaying the state of each side of a container. The expressions can be interpreted in the following way.

(1) A dotted line indicates that the position of the side in the document changes depending on the content of the container, like the side 410 shown in FIG. 6.

(2) A solid line indicates that the side is restricted because it is fixed (side 411), or the width or height of the container is fixed (in the container 408, the four sides are indicated by solid lines so that both the width and height are fixed).

(3) An anchor indicates that the point where sides or axes cross is fixed. Hence, the anchor point appears at the horizontal and vertical positions in all documents. The anchor is fixed, as a matter of course. The icon 409 in FIG. 6 is an example of an anchor icon which indicates that the position at which the sides 414 cross is fixed.

(4) A slider indicates that the associated side can be translated although it has a fixed length. For example, the sliders 413 in FIG. 6 indicate the content of the container 408 may be displayed on the left or right side of a position represented by a specific diagram in the document. For example, when the image size or text amount of data inserted in the container 407 associated with the container 408 (a link is set between the containers) is small, the size of the container 407 becomes small. For this reason, the container 408 is slid (translated) to the left and laid out. When the size of the container 407 becomes large, the container 408 is slid conversely to the right and laid out.

Some or all of these icons and sides are drawn or not drawn depending on which tool or which container is selected/highlighted or activated. Generally, the container sides and icons are not drawn on a printed product because they are assistant tools for designing the document template.

As described above, settings for the basic pattern including the basic values, minimum values, and maximum values of the width and height of a container are displayed in a secondary dialogue window.

Figure 7A:
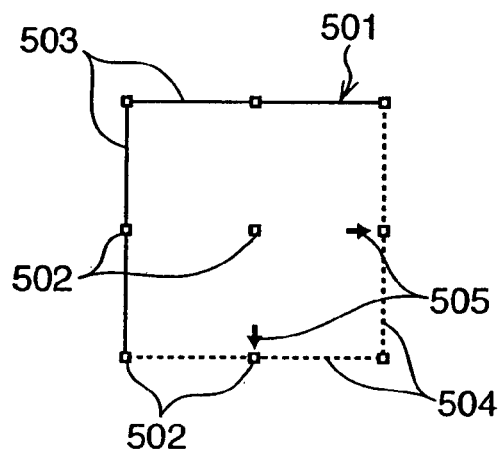
FIGS. 7A to 7D are views for explaining container rules according to the embodiment.

Referring to FIG. 7A, in a container 501, neither the width nor height is fixed (flexible). The fixed sides 503 are expressed by solid lines. The flexible sides 504 are expressed by dotted lines. The enlarge/reduce icons 505 represent the adjacent sides 504 are flexible. An indicator in another form may be used instead or additionally.

Figure 7B:
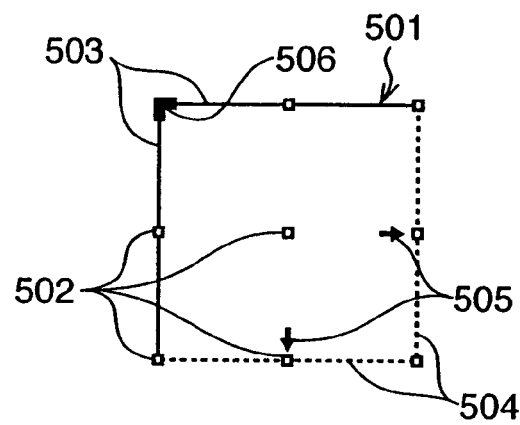

Referring to FIG. 7B, in the container 501, both the width and height are flexible. The anchor icon 506 is added to explicitly represent that the position of the corner at which the sides 503 cross is fixed.

Figure 7C:
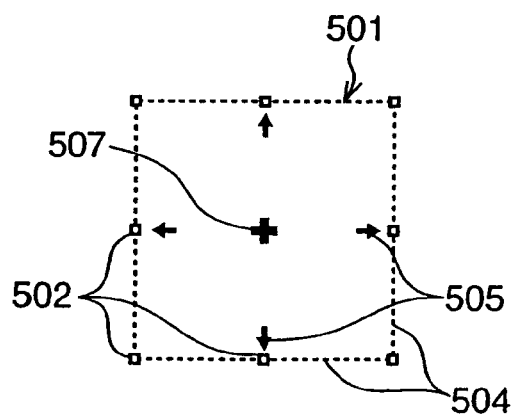

Referring to FIG. 7C, in the container 501, both the width and height are flexible. In this state, the container can extend equally from the central point indicated by the anchor icon 507. That is, the container 501 can be enlarged or reduced about the anchor icon 507. In enlargement/reduction, the layout is adjusted such that the anchor icon 507 is always located at the central point of the container 501.

Figure 7D:
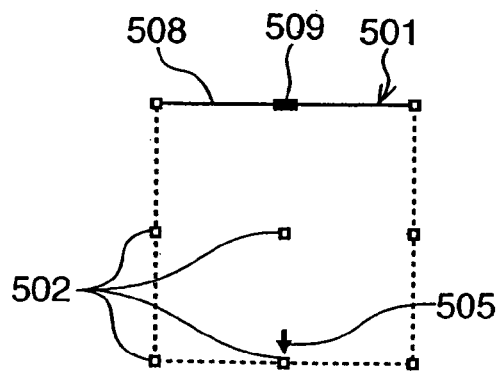

Referring to FIG. 7D, although an upper side 508 of the container 501 is fixed, both the width and height are flexible. The anchor icon 509 located at the center of the upper side 508 is fixed. The left and right sides of the container 501 enlarge or reduce the container about the central axis (vertical axis) extending perpendicularly through the anchor icon 509.

[Link Setting Method]

Figure 8:
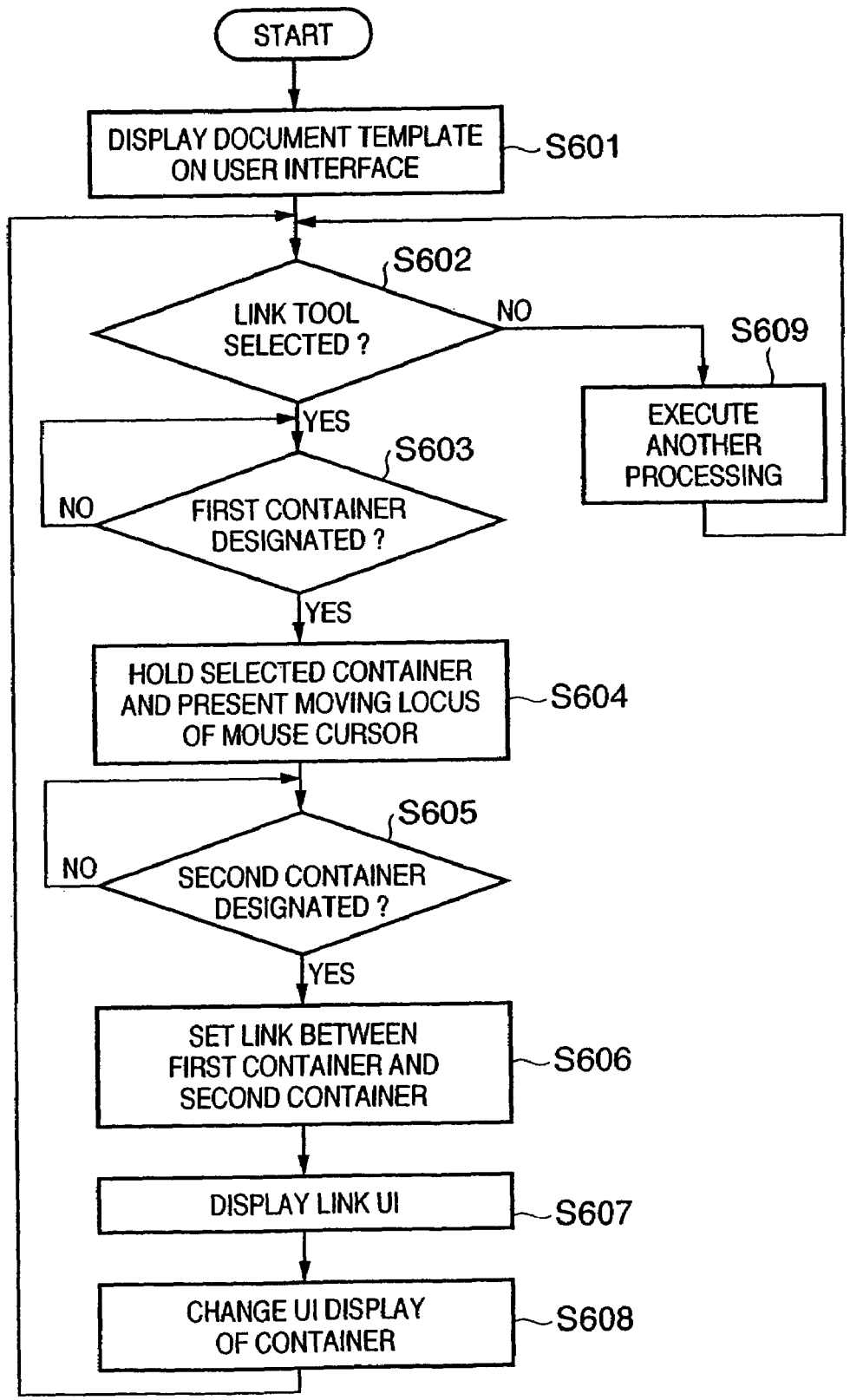
FIG. 8 is a flowchart for explaining link creation processing according to the embodiment.
Figure 9A:
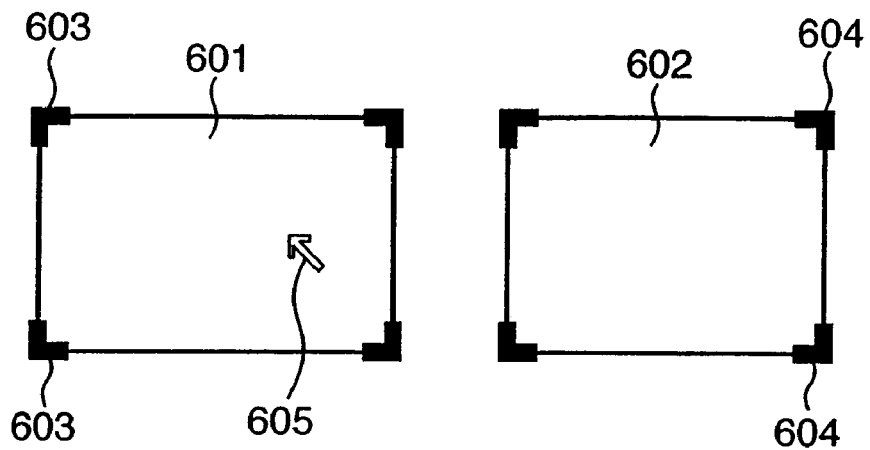
FIGS. 9A to 9C are views showing an example of transition of the user interface in creating a link.
Figure 9B:
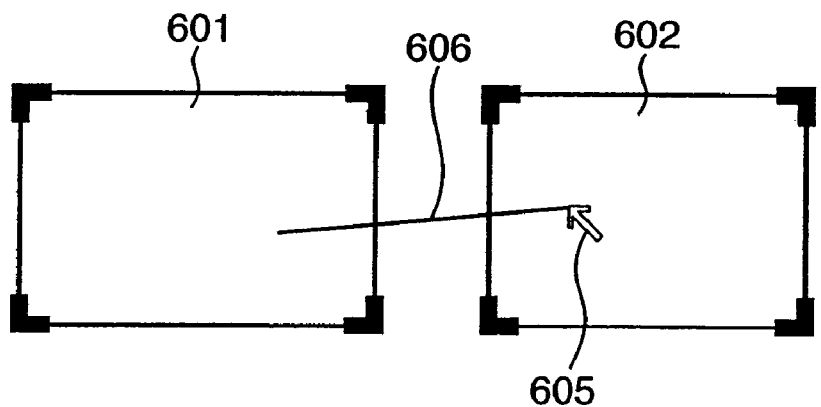
Figure 9C:
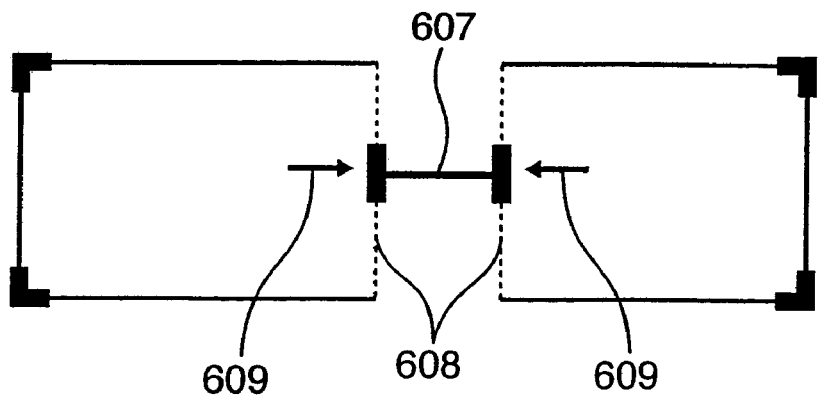

Setting of a link to associate containers with each other will be described next. FIG. 8 is a flowchart showing the link setting method. FIGS. 9A to 9C show an example of transition of the user interface (UI) in setting a link. A method of setting a link between containers will be described with reference to FIGS. 8 and 9A to 9C.

First, in step S601, the layout editing application 121 displays a document template selected for editing on the work area 306 of the user interface window. To set a link, containers (at least two containers) to set a link must be created on the document template. FIGS. 9A to 9C show an example of transition of the user interface when two containers are created in step S601, and a link is set.

In step S602, the layout editing application 121 determines whether the above-described link tool is set in a selected state (a selected state is set by clicking on the button 406 shown in FIG. 6). If NO in step S602, another processing is executed as needed (step S609), and the flow returns to step S602.

Referring to FIG. 9A, containers 601 and 602 have only fixed sides. Reference numerals 603 and 604 denote anchors which are the same as the anchor 409 in FIG. 6; and 605, a mouse pointer. When the link tool button 406 is in the selected state, the user clicks on one (container 601) of the two containers, for which a link is to be set, to select the container. In accordance with this operation, the user interface 103 of the layout editing application 121 recognizes that the first container is designated (step S603) and holds information to specify the selected container. In addition, a locus corresponding to further movement of the mouse cursor is displayed on the screen (step S604). For example, a line segment 606 shown in FIG. 9B indicates a line which connects the click point in the state shown in FIG. 9A and the current position of the mouse cursor. With this UI, the position where a link is to be set can explicitly be presented to the user.

Next, as shown in FIG. 9B, the user moves the mouse pointer to the other container (container 602) and clicks on it. In accordance with this operation, the user interface 103 recognizes that the second container is designated (step S605). The layout editing application 121 sets a link between the first container held in step S604 and the second container recognized in step S605 as a designated container (step S606).

When the link is set between the two containers 601 and 602 selected by the user, a link UI 607 is displayed (step S607). In addition, when the link is set, the display state of the containers changes to that shown in FIG. 9C (step S608). That is, when the link is set, the UI of the containers is automatically changed. In this case, the sides associated with each other by the link change to flexible sides and are indicated by dotted lines. Referring to FIG. 9C, sides 608 are indicated by dotted lines. That is, the sides 608 are flexible sides, as described above.

The state of the sides of the containers is automatically changed, as shown in FIG. 9C, because the containers must have flexible sides due to link setting. This aims at preventing any contradiction which may occur when all sides are fixed even after link setting. Marks 609 visually show the user the directions in which the containers can change due to link setting, like the icons 505 shown in FIGS. 7A to 7D. In the example shown in FIG. 9C, the right side of the left container and the left side of the right container change to flexible sides. This is merely an example. For example, the right container may change to setting with the sliders 413 in FIG. 6.

[Setting of Link with Flexible Length]

Figure 10:
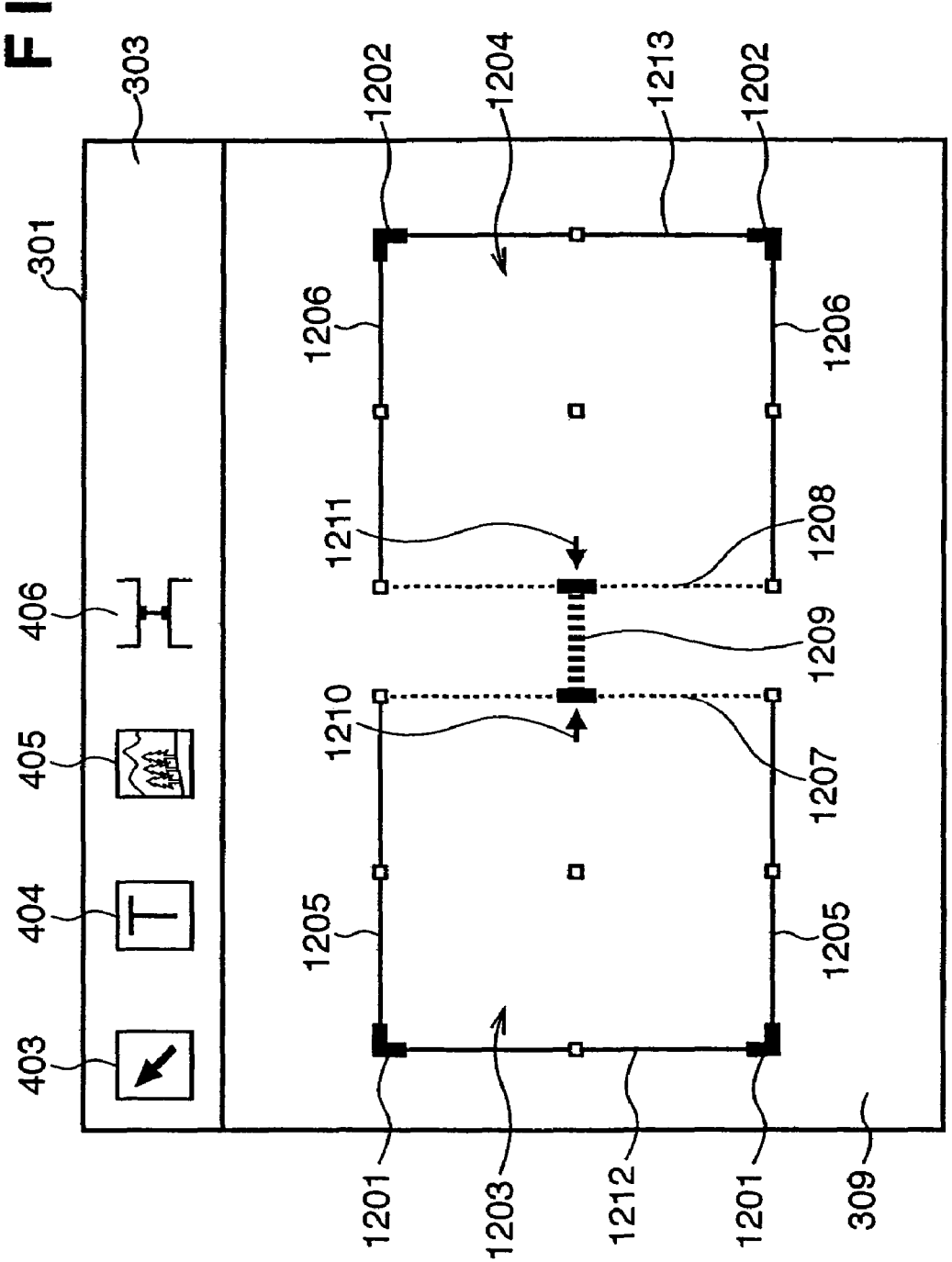
FIG. 10 is a view showing a display example in the user interface when containers are laid out by a flexible link.

FIG. 10 shows a user interface to set a flexible link. As in FIG. 6, the user interface has the application window 301 and tool bar 303. In the state shown in FIG. 10, containers 1203 and 1204 are present on the document template 309. The containers include anchor icons 1201 and 1202 and fixed sides 1205, 1206, 1212, and 1213. A link 1209 having a flexible size is set between the containers 1203 and 1204 to connect them. Since the link is set between the containers 1203 and 1204, a right side 1207 of the container 1203 and a left side 1208 of the container 1204 are expressed by dotted lines. Hence, indicators 1210 and 1211 are displayed in the containers to indicate that the sides 1207 and 1208 are flexible.

Figure 11:
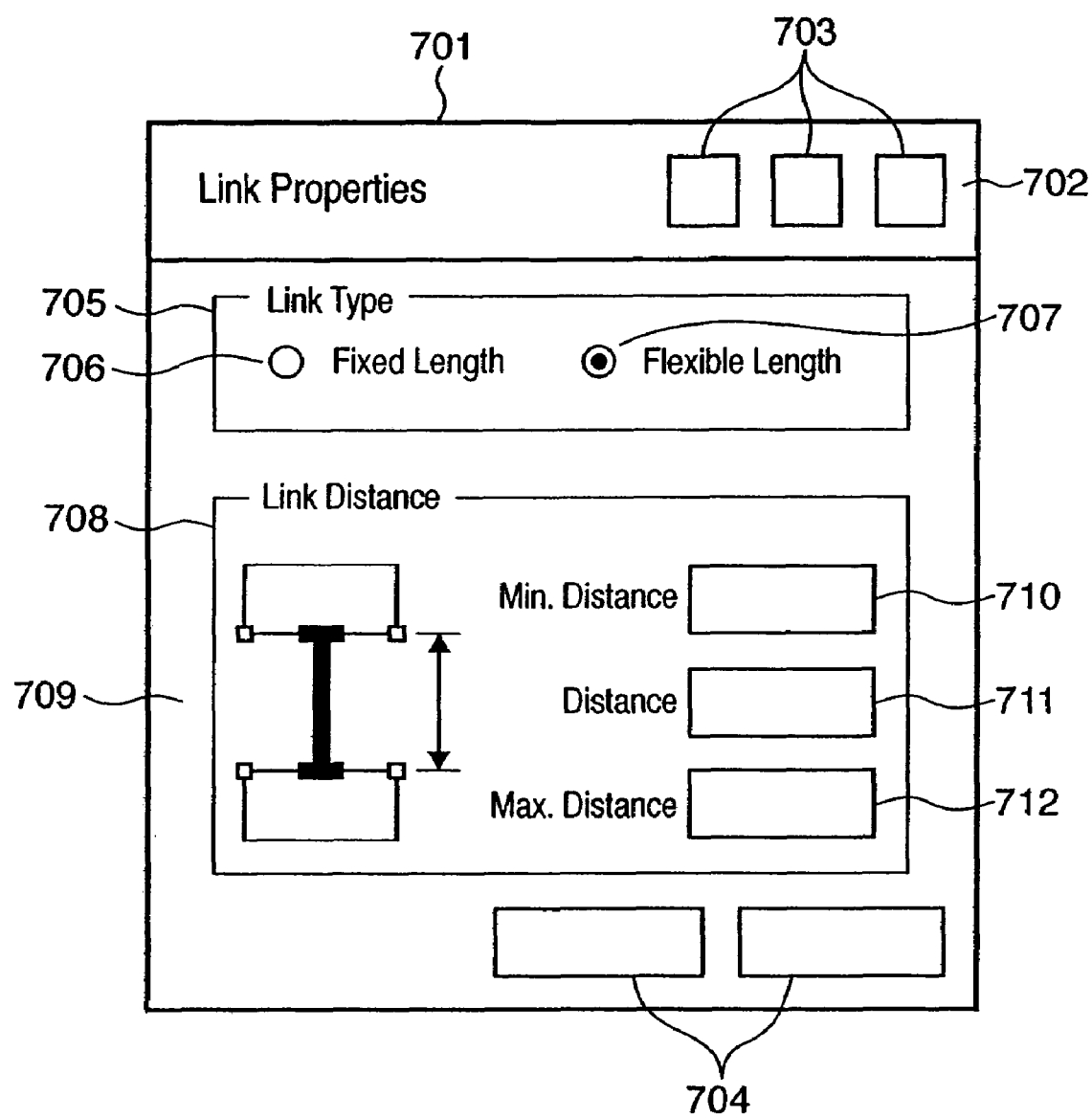
FIG. 11 is a view showing a link setting dialogue window according to the embodiment.

FIG. 11 shows a user interface window in the link setting means as the characteristic feature of the present invention. FIG. 11 shows an example of a dialogue window 701 to set the information of the link 1209. This dialogue includes a title bar 702, a tool button 703, a button 704 to open/close the dialogue window, and an area 709 to set various kinds of information. In this dialogue window, the link type can alternatively be selected from a flexible length (707) and a fixed length (706). When the link type is "flexible", the minimum value (Min. Distance 710), maximum value (Max. Distance 712), and reference value (Distance 711) of the link length can be set. The dialogue 701 shown in FIG. 11 is displayed when a link is set between two containers by the link setting operation described with reference to FIGS. 8 and 9A to 9C, and the set link is selected by, e.g., a click operation. Alternatively, immediately after a link is set, the dialogue window 701 related to the link may be displayed automatically. The reference value 711 of the distance between the containers indicates a link length used when the size of each container does not change at the time of data insertion.

Figure 12:
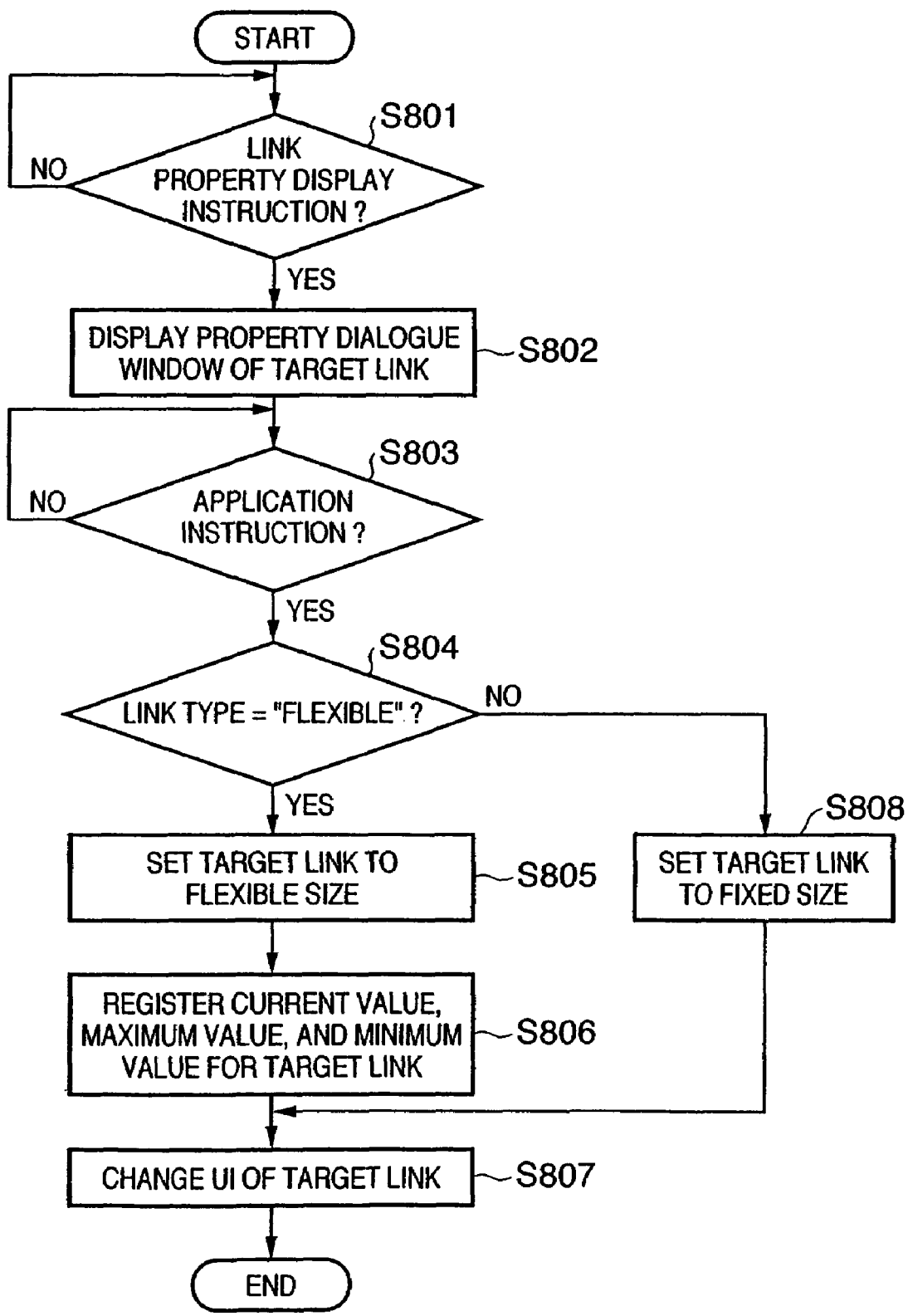
FIG. 12 is a flowchart for explaining processing for setting a flexible link by the user interface according to the embodiment.
Figure 15:
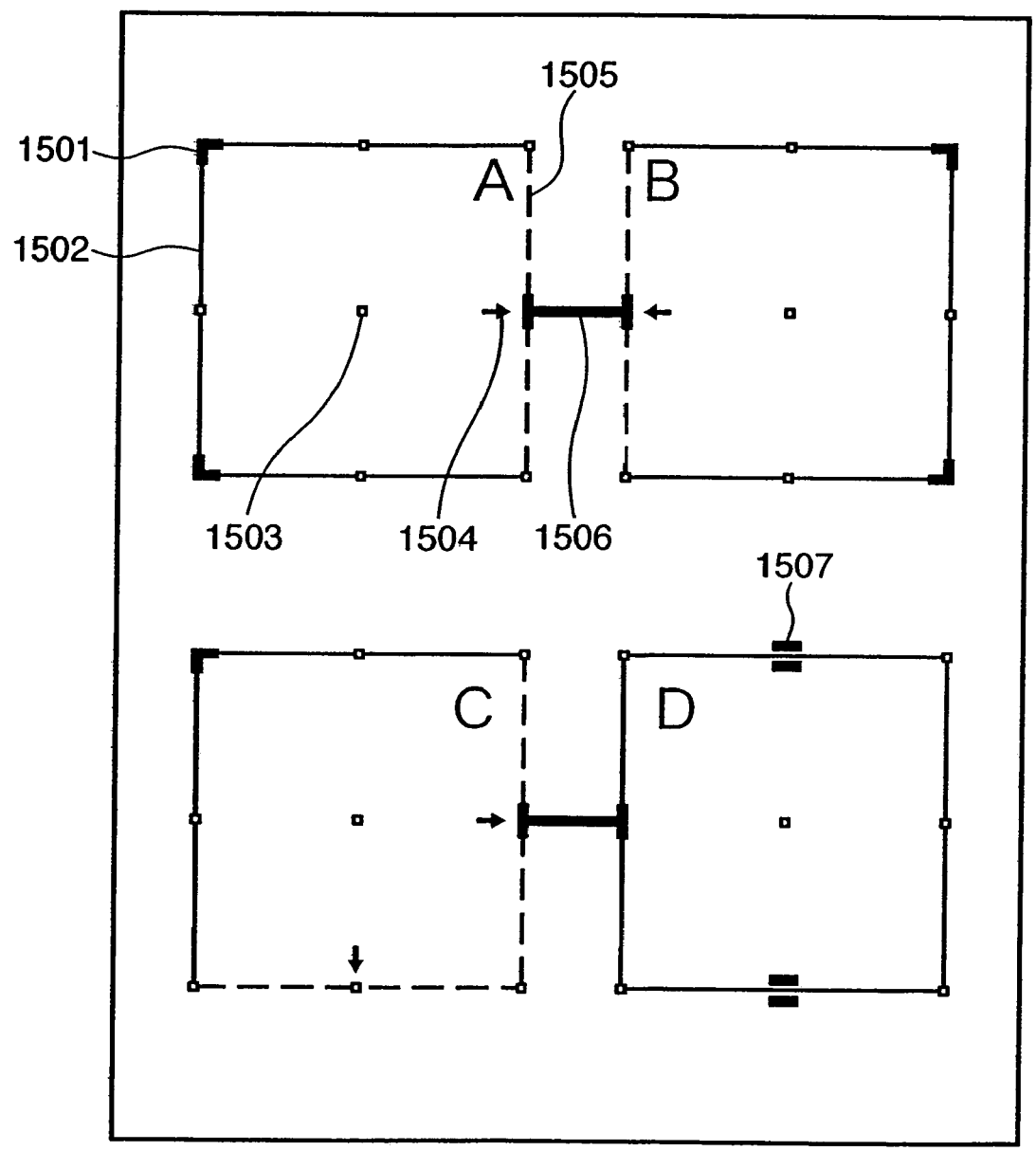
FIG. 15 is a view for explaining a set of containers in layout calculation processing according to the embodiment.

FIG. 12 is a flowchart for explaining flexible link setting procedures by the user interface 103 according to this embodiment. For example, when a link is set between containers A and B shown in FIG. 15 in accordance with the procedures described with reference to FIGS. 8 and 9A to 9C, a link with a fixed size is set first. When this link is selected, and processing shown in FIG. 12 is executed, the link can be changed from a link 1506 (FIG. 15) with a fixed size to a link 1209 (FIG. 12) with a flexible size.

First, a desired link (e.g., link 1506) is selected by the mouse, and a predetermined operation to display link properties is performed. The user interface 103 of the layout editing application 121 recognizes the operation as input of a link property display instruction (step S801). Upon recognizing the link property display instruction, the user interface 103 displays the property dialogue window 701 (FIG. 11) corresponding to the selected link (to be referred to as a target link hereinafter) and displays link properties (step S802). A link can be selected by any operation such as clicking on the right button of the mouse or operating a specific key of the keyboard, like in setting the basic pattern of a container.

The current state of the selected link is shown in the dialogue window 701 displayed in step S802. In this example, since the link 1506 is selected, the link size is fixed at this step. As a Link Type 705, the Fixed Length 706 indicating a fixed length is selected.

In the dialogue window 701, the Flexible Length 707 is selected as the Link Type 705 to change the link from the fixed size to the flexible size. Accordingly, the Max. Distance 712, Min. Distance 710, and Distance 711 arranged in a Link Distance 708 are validated, and numerical values can be set. To set the flexible size of the link, the user sets the maximum value of the link length in the Max. Distance 712, the minimum value in the Min. Distance 710, and the current value in the Distance 711.

When setting is ended, the user instructs application of the setting by clicking on the general dialogue window open/close button 704. When the user interface 103 detects this instruction, the processing advances from step S803 to step S804 to reflect the set state on the target link.

In step S804, the layout editing application 121 determines whether the target link has a fixed size or flexible size. When a fixed size is designated, the flow advances to step S808 to set the target link to "fixed size". In step S807, the display state of the target link is changed to "solid line" representing "fixed link".

If it is determined in step S804 that a flexible size is designated, the flow advances to step S805. The layout editing application 121 sets the target link to "flexible size". In step S806, the current value (reference value), maximum value, and minimum value of the target link set in the dialogue window 701 are registered. In step S807, the display state of the target link is changed to "dotted line" representing "flexible link". As a result, the UI display of the link changes to the state indicated by the link 1209 in FIG. 10. The pieces of setting information of the dialogue window 701 are stored in the memory.

As the current value set in the Distance 711, the distance between the containers currently laid out may be input automatically as a default value.

Document template layout editing by the user interface 103 has been described above. Container layout adjustment processing corresponding to a data size (drawing size) when a data source is inserted in each container will be described below.

<Layout Calculation Processing by Layout Engine>

[Layout Calculation Method (Overall Flow)]

The layout editing application of this embodiment has a layout mode in which containers are created by using the user interface 103, and a layout is created by associating the containers with each other (link setting), and a preview mode in which each record of a data source is inserted in the created layout by the layout engine 105, and the layout result after actual record insertion is previewed. In the preview mode, actual records are inserted, and a layout is calculated in accordance with the above-described priority order. In the preview mode, however, the layout for display is calculated. Even in actual printing, the layout is calculated by causing the layout engine 105 to insert data in each container. The calculation method at this time is the same as in the preview mode.

Figure 13:
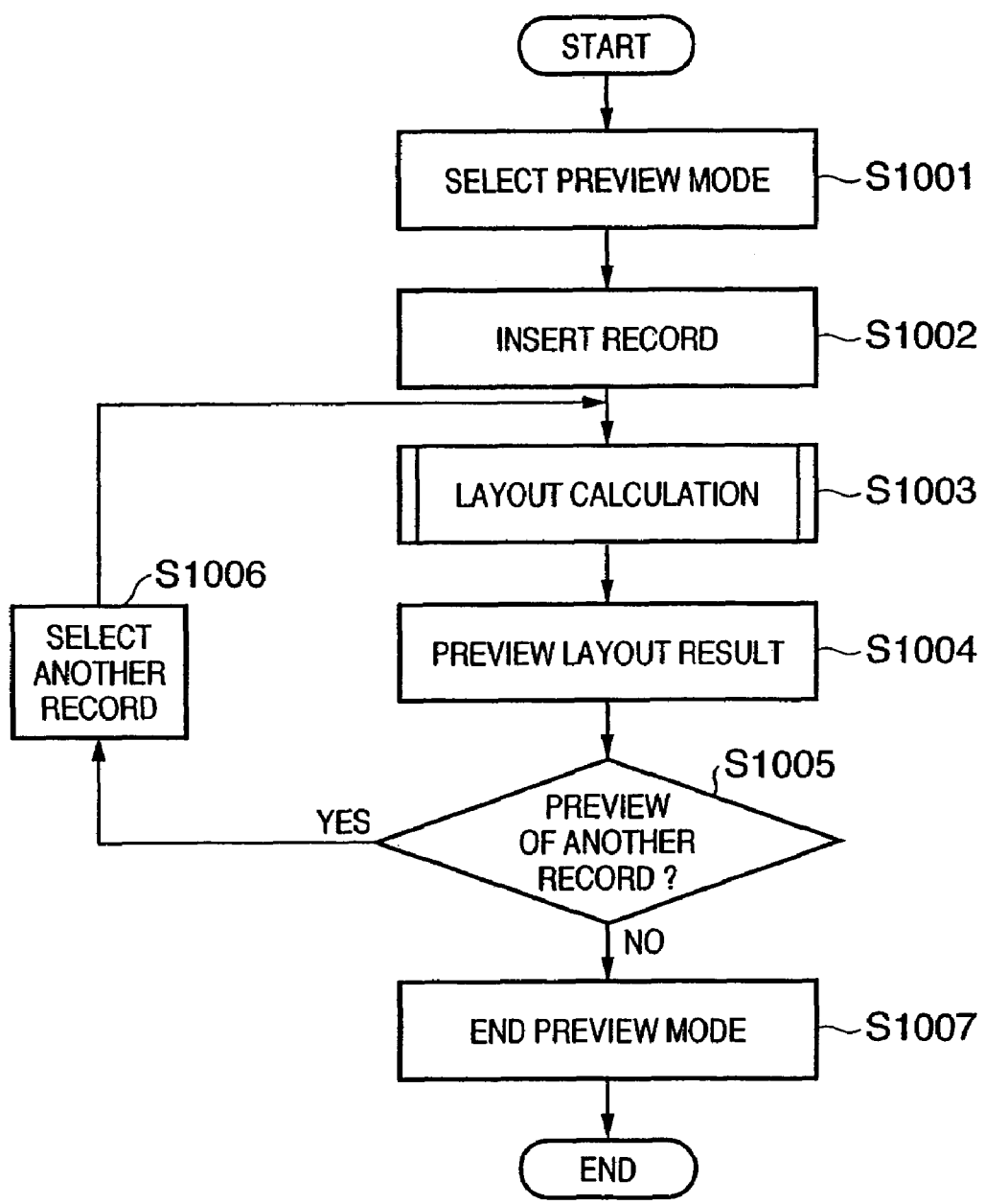
FIG. 13 is a flowchart showing layout calculation processing by a layout engine according to the embodiment.

FIG. 13 shows the flow of layout calculation. First, the preview mode is selected (step S1001). In the preview mode, the layout editing application 121 causes the user to select a record to be previewed from the data source and determines to insert each field data of the selected record in each container (step S1002). When insertion of the field data in each container is determined, the layout editing application 121 executes calculation to lay out the record and executes layout adjustment as needed (step S1003). The layout calculation in step S1003 will be described later in detail. The layout editing application 121 displays the layout calculated in step S1003 (step S1004). The layout editing application 121 determines in accordance with a user instruction whether to preview another record (S1005). If NO in step S1005, the preview mode is ended (S1007). If YES in step S1005, the layout editing application 121 selects another record, executes layout calculation again, and previews the layout (step S1006).

When not the preview mode but the print mode is set, layout calculation is done sequentially for all records to be printed. Hence, step S1004 is omitted. In step S1005, it is determined whether all records to be printed are processed. The result calculated in step S1003 is output, and print data is generated by using the printer driver and output to the printer. In this case, when print data output is ended for all records (all records designated for printing), the processing is ended.

[Layout Calculation Method (Details)]

Figure 14:
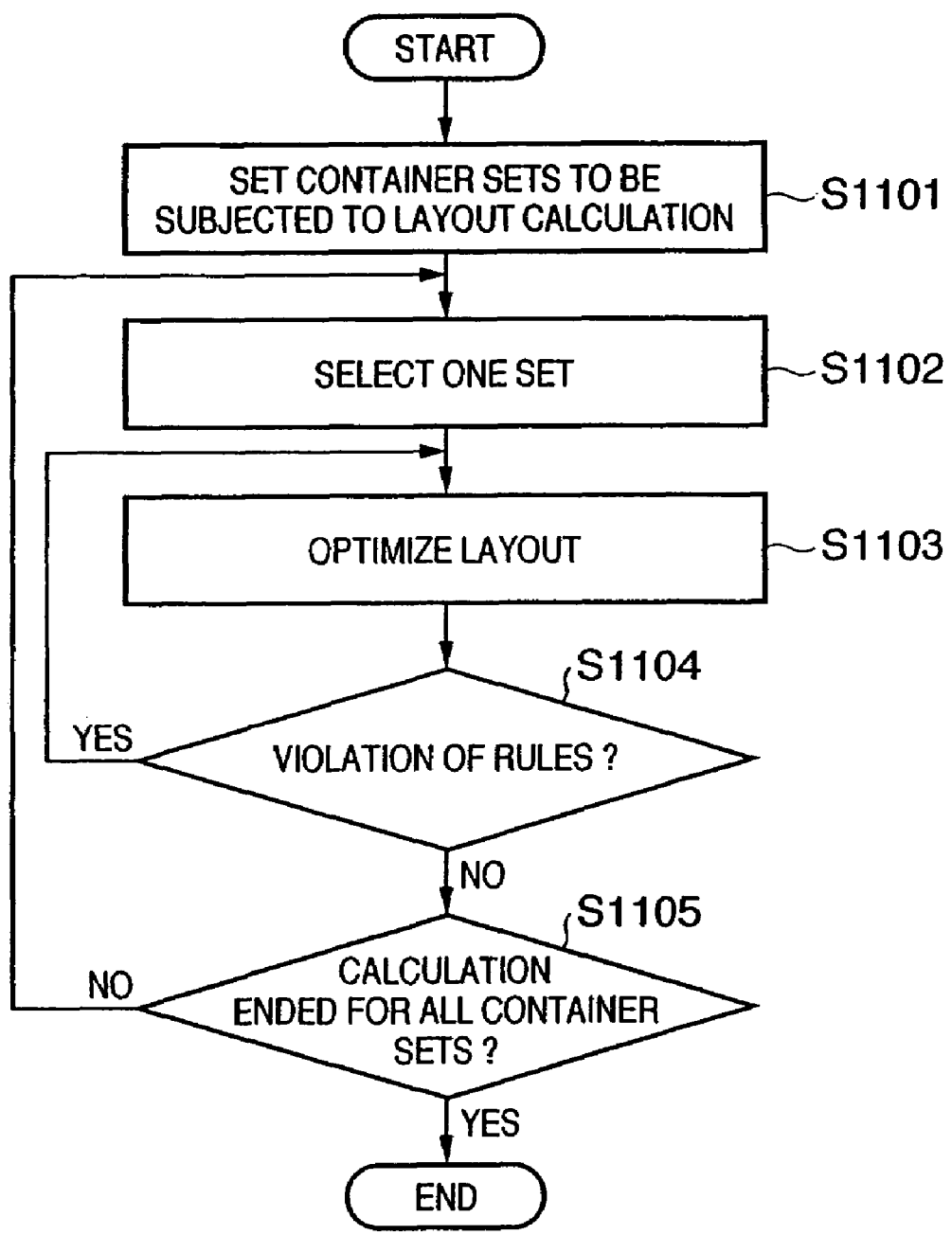
FIG. 14 is a flowchart showing layout calculation processing by the layout engine according to the embodiment.
Figure 18A:
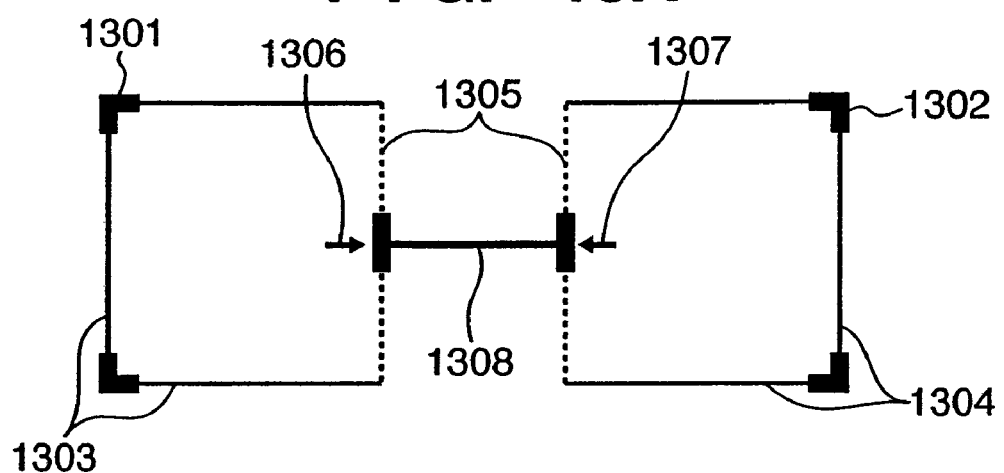
FIGS. 18A to 18C are views for explaining layout calculation processing according to the embodiment.
Figure 18B:
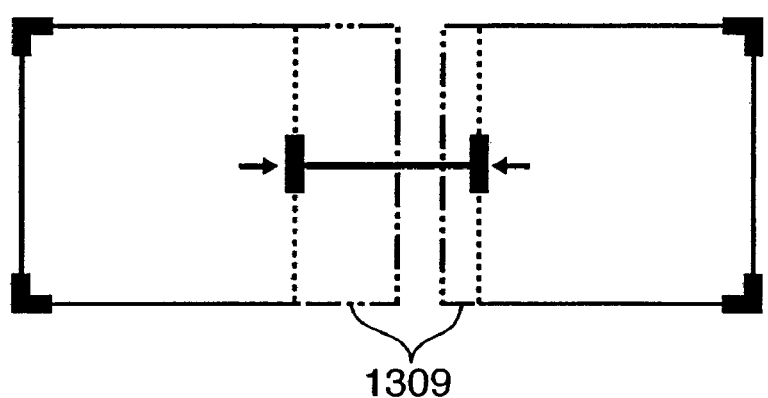
Figure 18C:
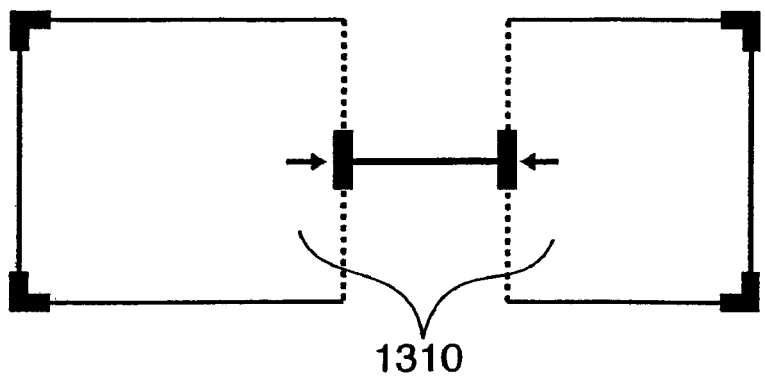

The layout calculation in step S1003 will be described next in detail. FIG. 14 is a flowchart showing a layout calculation method when the layout priority order of this embodiment is not set. FIGS. 18A to 18C are views showing an example of the UI display at this time. FIG. 14 is a flowchart for explaining only the layout calculation processing method. This corresponds to the layout calculation method in printing/previewing one record of variable data print. When a plurality of records are present, the following processing is repeated.

First, the layout editing application 121 obtains a set of containers whose layout should be calculated (step S1101). Layout calculation is executed for a set of associated containers. Referring to, e.g., FIG. 15, four containers are laid out on a page and associated with each other. In this case, the containers A and B are associated by a link, and containers C and D are also associated by a link. Hence, the containers A and B form set 1, and containers C and D form set 2. That is, a group of containers connected by a link is specified as a set. As described above, reference numeral 1501 denotes an anchor; 1502, a fixed side; 1503, a handle; 1504, an arrow which indicates the change direction of a flexible side; 1505, a flexible side; 1506, a link; and 1507, a slider.

The layout editing application 121 selects a set as a layout calculation target from the container sets obtained in step S1101 (S1102). For the selected container set, layout calculation is executed. First, the sizes of the two containers (A and B) as flexible elements included in the selected container set are calculated assuming that the containers are not affected by the image size or text amount of data to be inserted. More specifically, the layout editing application 121 determines whether the container A is an image data container or text container. This determination can be done on the basis of the attribute set for the container, as described above. Next, the layout editing application 121 loads the data to be inserted in the container A. When the container A is an image data container, the size (the number of horizontal pixels, the number of vertical pixels, and the resolution) of the image data is defined as the size of the container A without any constraint. When the container A is a text container, the amount of data to be inserted in the container A can be calculated on the basis of the number of characters of text data and the character attribute such as a font type, font size, character pitch, and line pitch designated by the container attribute of the container A. For the text container, a constraint is applied because the aspect ratio of the container A cannot be determined without considering a constraint. In the example shown in FIG. 15, since anchors are set at the upper left and lower left corners of the container A, the height (vertical direction) is fixed. Hence, the layout editing application 121 determines whether characters corresponding to the calculated data amount (text amount) can be inserted in the container A having the width (horizontal direction) set as the basic pattern of the container A. If it is determined that all characters can be inserted, the size (width and height) set by the basic pattern does not change in the container A. If it is determined that not all characters can be inserted, the container A expands in the horizontal direction because the height is fixed by setting the anchors. In this case, the layout editing application 121 calculates the width of the container A, which allows insertion of characters in the calculated amount, thereby calculating the size of the container A.

Next, the layout editing application 121 optimizes the layout such that the difference between the size of each container to be laid out and the actual content size becomes as small as possible (S1103). The layout is optimized such that the difference between the size of the content to be inserted and the size of layout becomes as equal as possible between the containers associated with each other to dynamically change their sizes. The layout editing application 121 obtains the size of the container set selected in step S1102, i.e., the total size of the container A, container B, and link 1506 (for a fixed link, the set link length is used, and for a flexible link, the link length set to the reference value is used). Then, the layout editing application 121 calculates the difference between the total size and the size of the container set in the basic layout (in the example shown in FIG. 15, the size of the container set corresponds to the distance between the anchor icons of the containers A and B). If the width of the container A or B is increased by the calculation, a different value is generated. The layout editing application 121 equally distributes the difference value to the elements of the container set, thereby adjusting the layout.

The layout editing application 121 optimizes the layout. If a violation of rules has occurred, calculation is executed again to prevent any violation of rules (S1104). The rules described here are constraints set by the user in creating the layout. Examples of the constraints are a constraint on the container size change range or container position, and for a flexible link, a constraint on the change in link length. When the layout is calculated without any violation of rules, the layout of the set is completed. The processing in steps S1102 to S1104 is executed for all sets on the page. With the processing, the layout editing application 121 calculates the layout of the entire page (S1105).

A layout calculation method using a flexible link according to this embodiment will be described next in more detail.

Figure 16A:
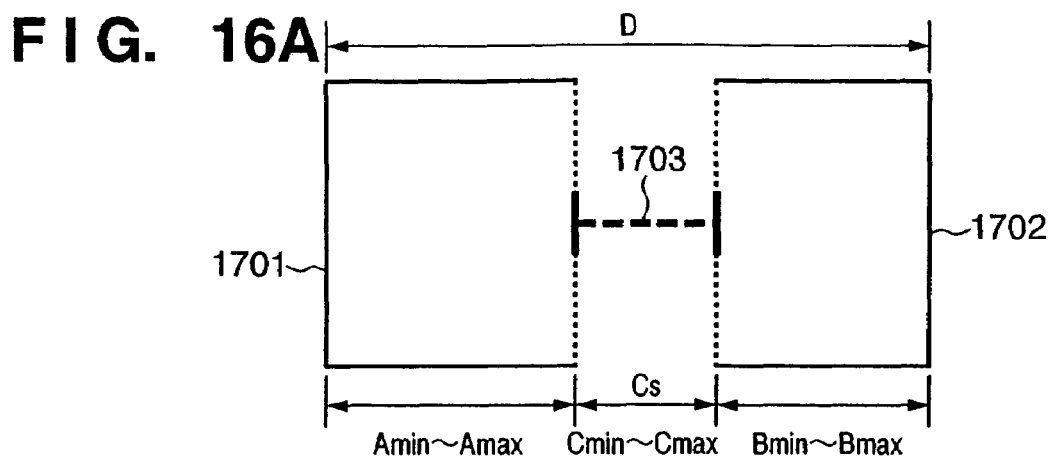
FIGS. 16A to 16C are views for explaining layout calculation according to the embodiment.

Assume that two containers are connected by a link, and their layout and sizes are set as shown in FIG. 16A. The left, upper, and lower sides of a container 1701 are fixed. The right, upper, and lower sides of a container 1702 are fixed. A horizontal size D of the whole set including the containers 1701 and 1702 is fixed. A link 1703 is flexible. The reference value (the value set as the current value in the dialogue window 701) is set to Cs, and the change range (the range from the minimum to maximum values in the dialogue window 701) is set to Cmin to Cmax. The change ranges of the containers 1701 and 1702 are set to Amin to Amax and Bmin to Bmax, respectively, by a predetermined user interface. Layout calculation when contents are inserted in the containers in this state will be described with reference to the flowcharts shown in FIGS. 14 and 17.

First, in steps S1101 and S1102, the set including the containers 1701 and 1702 is selected as a target set for calculation. In steps S1103 and 1104, the layout is optimized within the range of constraints for layout setting. The layout optimization in the selected set in steps S1103 and S1104 will be described below.

The layout editing application 121 calculates the ideal size of each container when data is inserted in it by using the same calculation method as in FIG. 14 (S1801). In the example shown in FIG. 16A, the heights of the containers 1701 and 1702 are fixed. Hence, the width (to be referred to as an ideal width) necessary for each container is calculated on the basis of the content to be inserted. For example, when the content is image data, the ideal value can be determined on the basis of the aspect ratio of the image by making the image size coincide with the height of the container. When the content is text data, the respective lines (a section from the start of a line to line feed is called a line) are linearly aligned, and the width of the container is decreased until the size coincides with the height of the container, thereby determining the ideal value. When the width and height of the container are flexible, and the content is image data, the ideal value is determined by using the image size. When the width and height of the container are flexible, and the content is text data, the maximum width when the respective lines are linearly aligned is obtained as the ideal value. The total width of the set by the ideal widths of the containers 1701 and 1702 and the reference value of the link 1703 is compared with the set width D of the set (step S1802).

Let Ac and Bc be the ideal widths calculated for the containers 1701 and 1702. Since the reference value (the value set in the Distance 711 in the dialogue shown in FIG. 11) of the link 1703 is Cs, the layout editing application 121 determines whether Ac+Bc+Cs=D (step S1803). If YES in step S1803, the layout editing application 121 determines the layout on the basis of the widths Ac and Bc and the link length Cs (step S1804).

If Ac+Bc+Cs≠D, the layout editing application 121 equally distributes the difference to the containers and flexible link (step S1805). More specifically, a difference value δ to the set width D is calculated by $$\delta = (Ac+Bc+Cs)-D$$

The difference value δ is distributed to the two containers 1701 and 1702 and one link 1703. That is, $$A'=Ac-(\delta/3)$$

$$B'=Bc-(\delta/3)$$

$$C'=Cs-(\delta/3)$$

are calculated to optimize the layout. According to this optimization, the width of each container box or the link length increases or decreases such that the set width D is obtained. In this example, the difference is equally distributed to the elements (the containers and flexible link). This calculation is effective only in the horizontal direction, i.e., when the distribution can be considered one-dimensionally. As will be described later in FIG. 16C, when difference distribution is considered two-dimensionally based on anchor setting, layout adjustment is done such that the basic layout determined by the user is maintained as much as possible. Hence, no equal distribution is executed.

Figure 17:
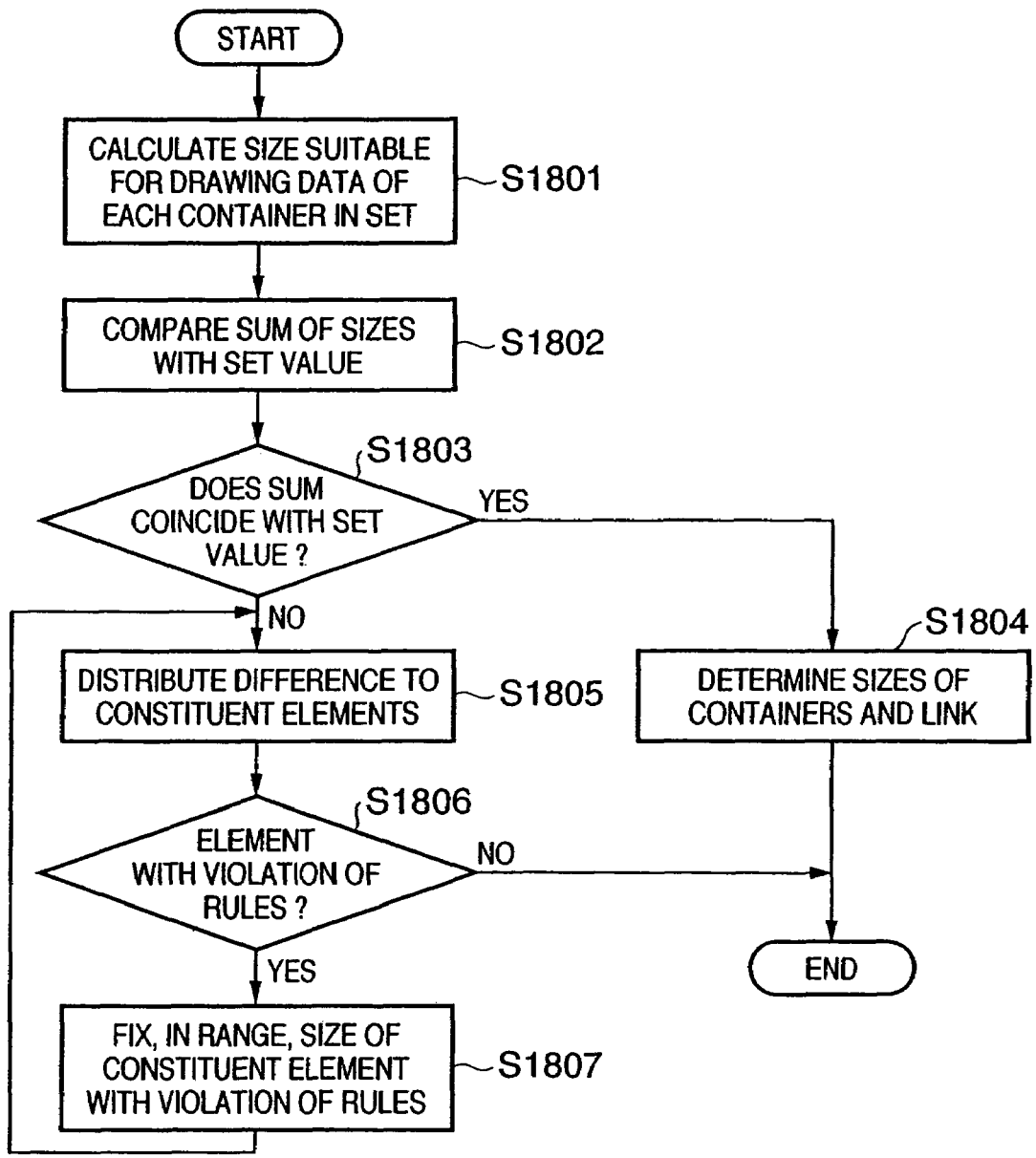
FIG. 17 is a flowchart for explaining details of layout calculation processing according to the embodiment.

In step S1104 in FIG. 14 and step S1806 in FIG. 17, the layout editing application 121 detects whether a violation of rules has occurred. For example, it is checked whether the values A' to C' calculated above fall outside the container change ranges (Amin to Amax and Bmin to Bmax) or the link length change range (Cmin to Cmax) set in setting the layout. If a value falls outside the set range, the flow returns to step S1103 to execute layout calculation again to apply the rule. As a method of this calculation, the size of the element whose calculated size falls outside the set range is fixed in the set range, and the difference value is distributed to the remaining elements (steps S1807 and S1805). For example, when (Ac+Bc+Cs) is larger than the set width D, and the link length C' obtained by distributing the difference value by the above equations is smaller than the set minimum value Cmin, the following processing is executed.

The link length is determined to the minimum value Cmin, and the difference value $\delta'$ is calculated by $$\delta' = (Ac + Bc + Cmin) - D$$

The difference value $\delta'$ is distributed to the widths of the containers 1701 and 1702. That is, $$A' = Ac - (\delta'/2)$$

$$B' = Bc - (\delta'/2)$$

$$C' = Cmin$$

Accordingly, the sizes of the containers and link are determined.

Figure 16B:
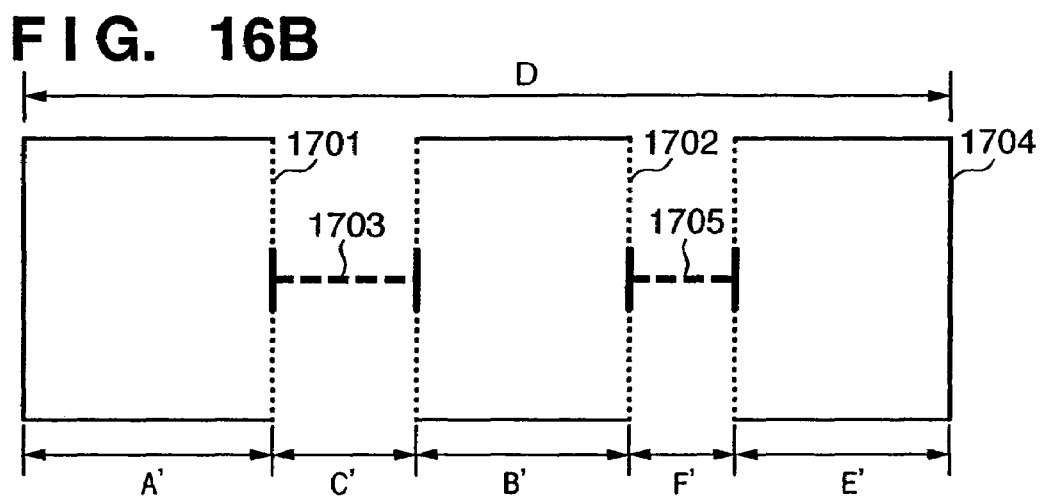
Figure 16C:
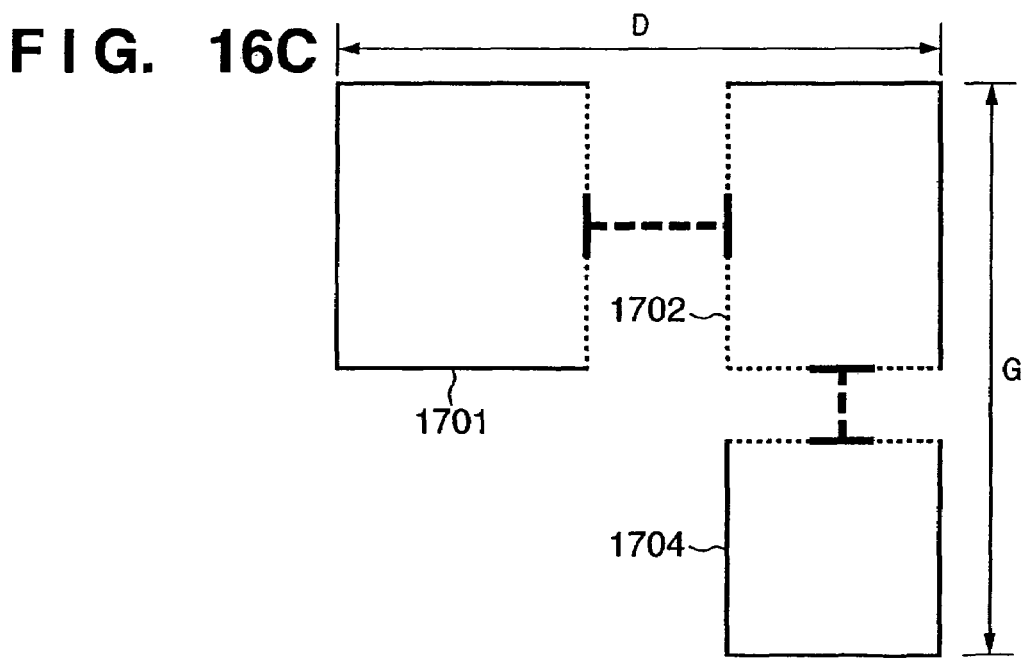

The layout calculation in the horizontal direction has been described above. The method can also be applied to layout calculation in the vertical direction for a set including containers laid out in the vertical direction and a flexible link. The method can also easily be extended to a case in which three or more containers are laid out in the same direction (horizontal or vertical direction) and connected by links. More specifically, in a set including the containers 1701, 1702, and 1704 and flexible links 1703 and 1705, as shown in FIG. 16B, let Ac, Bc, and Ec be the ideal widths of the containers, and Cs and Fs be the reference values of the links. In this case, the set width D of the set is compared with "Ac+Bc+Ec+Cs+Fs". If the values do not coincide, the difference between them is equally distributed to the containers and links to adjust the layout.

The method can also easily be extended to a case in which a container or link having a fixed size is included in the direction of layout calculation. In this case, the calculated difference value is not distributed to the fixed container or link.

In the above example, the difference is equally distributed to the containers and flexible link. Priority may be given to each container and link, and the difference may preferentially be distributed to a region with higher priority. For example, in the link property setting UI shown in FIG. 11, a check box "change link with higher priority than container" is prepared. When this check box has a check mark, the difference is preferentially distributed to the flexible link. In this case, the length of the flexible link is adjusted first within its change range, thereby making the width of the set coincide with the set width. If the set width cannot be obtained even when the flexible link is set to the maximum or minimum value, the difference value is distributed to the containers, thereby adjusting the layout. That is, as a characteristic feature of this embodiment, it is important to adjust at least the length of the flexible link in layout adjustment, and a great-looking layout is implemented by this processing.

Container layout also often handles a two-dimensional layout in the horizontal and vertical directions. For example, in the layout shown in FIG. 16C, the target set of layout adjustment includes the containers 1701, 1702, and 1704 and flexible links 1703 and 1705. In this embodiment, adjustment is done first in the horizontal direction and then in the vertical direction. More specifically, layout adjustment is executed between the containers 1701 and 1702 in accordance with the above-described procedures such that the set width D is obtained. After that, layout adjustment is executed between the containers 1702 and 1704 such that a set hight G is obtained. However, when adjustment is simply done first in the horizontal direction and then in the vertical direction, the adjustment amount may concentrate in the first adjustment direction (horizontal direction), and the layout result may be different from the basic layout desired by the user. To prevent the deviation of the layout result from the basic pattern (aspect ratio) as much as possible, for each container, the square of the difference between the width of the basic pattern and the width after layout adjustment is added to the square of the difference between the height of the basic pattern and the height after layout adjustment. The sum is calculated for all containers. The layout editing application 121 may execute layout adjustment by calculating the width and height of each container such that the total of the sums of the squares for the containers is minimized. In this embodiment, this method is called a least square method. When this least square method is used, the final layout which is in good balance as a whole can be determined without largely deviating from the basic layout initially set by the user.

FIGS. 18A to 18C show a UI example in laying out containers without setting the priority order.

FIG. 18A shows a state in which records are inserted, and the layout is determined. Reference numerals 1301 and 1302 denote anchors; 1303 and 1304, fixed sides; 1305, a flexible side; 1306, an arrow which indicates the change direction of a flexible side; and 1308, a link. In this state, the records are changed, and contents having different sizes are inserted. Referring to FIG. 18B, the sizes of the new contents are superposed on the state shown in FIG. 18A. Reference numeral 1309 denotes a size of the content to be inserted in each container. Layout calculation is executed. FIG. 18C shows the result of layout calculation. The sizes of the containers are calculated such that they have the same difference to the size of the content to be actually inserted, and no violation of the above-described rules occurs. The difference between the size (1309) of the content to be inserted shown in FIG. 18B and the reference container (1305) shown in FIG. 18A is equally distributed to the containers and link when the link 1308 is flexible. As a result, as shown in FIG. 18C, the content size (1309) to be inserted shown in FIG. 18B and a content size (1310) after calculation have the same difference to the reference container size.

The effect of a flexible link when data to be inserted in a container is an image will be described next with reference to FIGS. 19 and 20.

Figure 19:
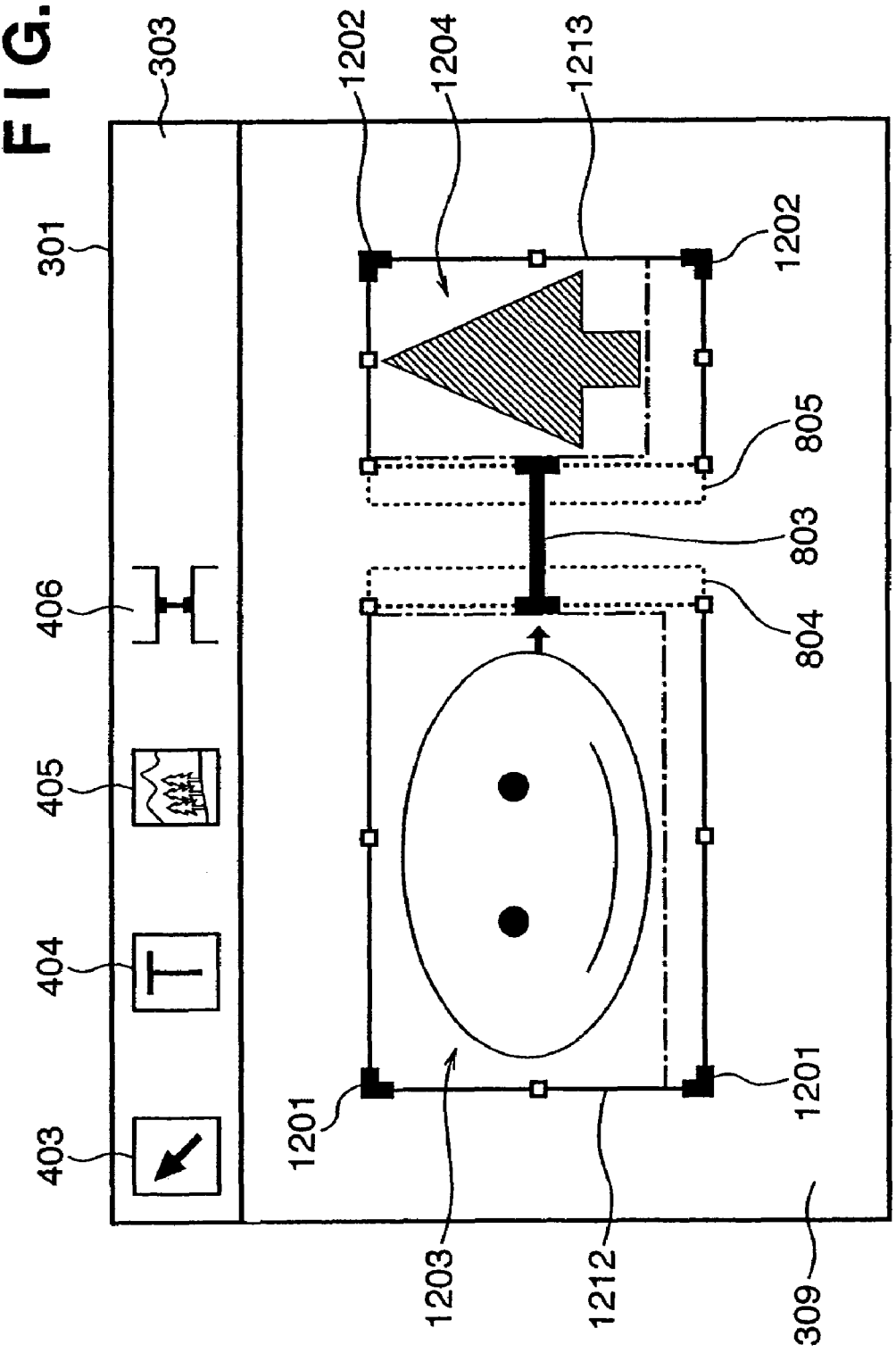
FIG. 19 is a view showing an example of a layout result by a fixed link.

FIG. 19 shows a layout result when a link with a fixed size is used in the link 1209 of FIG. 10. Layout calculation is executed in the above-described way. For example, assume that image data having different sizes are inserted in the containers 1203 and 1204 shown in FIG. 10. In this case, each container regards the data size as optimum. The container 1203 changes its size rightward to a frame 804 (optimum container size) corresponding to the size of the inserted image. Similarly, the container 1204 changes its size leftward to a frame 805 (optimum container size) corresponding to the size of the inserted image. However, the left side 1212 of the container 1203 and the right side 1213 of the container 1204 cannot be moved because of the anchors 1201 and 1202. To change the sizes of the containers, the distance between them must be shortened. However, a link 803 having a fixed size is set between the containers. Since the link length is maintained in the layout calculation, the sizes of the containers 1203 and 1204 are changed.

As a consequence, the containers 1203 and 1204 cannot ensure the optimum sizes corresponding to the aspect ratios of the data. Finally, as shown in FIG. 19, the container sizes are smaller than the optimum sizes (frames 804 and 805). That is, since the size of the link 803 is fixed, the containers 1203 and 1204 cannot achieve the optimum sizes (referring to FIG. 19, the range indicated by the alternate long and short dashed line in each container represents the aspect ratio of the data).

FIG. 20 shows the same case as in FIG. 19 except that the link has a flexible size. In this case, a link having a flexible size is set between the containers 1203 and 1204 of the above example, as shown in FIG. 20. Hence, when the sizes of the containers 1203 and 1204 are changed, the link size decreases so that the containers 1203 and 1204 can be larger than in the example shown in FIG. 19. As a result, optimum sizes corresponding to the inserted data sizes can be achieved. Alternatively, container frames close to the inserted data sizes (optimum sizes) can be set. FIG. 20 shows this result. The size of the flexible link 1209 changes to a size indicated by a flexible link 903 as a result of layout calculation. In this case, the containers 1203 and 1204 have optimum sizes (sizes corresponding to the data sizes).

Second Embodiment

In the first embodiment, to set a link having a flexible size between containers by the user interface 103, a fixed link is set first. Then, the desired link is selected, and the dialogue as shown in FIG. 11 is displayed to set a flexible link. In the second embodiment, a modification of the user interface to set a flexible link will be described.

FIG. 21 is a view showing an example of a user interface according to the second embodiment. A new link tool 407 is added to the user interface shown in FIG. 10. A link tool 406 is a tool to set a fixed link. To change a fixed link to a link with a flexible size, the procedures shown in FIG. 12 (first embodiment) are necessary.

When the link tool 407 is used, a flexible link can be set between containers from the beginning, unlike the link tool 406. For this reason, when the user wants to set a flexible link from the beginning, it is unnecessary to open the property dialogue window and change a fixed link to a flexible link. A link is set in accordance with the above-described procedures assuming that the link with the flexible size set between containers has preset values (maximum value, minimum value, and size in link setting). If the user wants to set links having the same flexible range between a number of containers, an effect of quickly setting the links between the containers by designating the flexible size in advance can be expected as well as the above-described effect. As the size (link size in link setting) set between container by using the link tool 407, the current distance between containers is preferably maintained. This size is generally set in advance in the property dialogue window described above with reference to FIG. 11. When the link tool 407 is selected, a link is set between containers by using the set value as a default value. The UI display of the link set by using the link tool 407 is different from the display of a fixed link, as described above, when the link is set between the containers. For example, the flexible link is indicated on the UI by using a dotted line representing a flexible link, like the link indicator 903 shown in FIG. 20. In layout calculation later, a layout is calculated in accordance with the above-described layout calculation rules.

As described above, according to the above-described embodiments, priority can be given to the optimum size of each container. Containers can be laid out in more ideal sizes, and a layout result desired by the user can be provided. For this reason, for example, an optimum container size can always easily be obtained. Since the link size is flexile, the distance between containers can flexibly be changed in accordance with the amounts of inserted data at different times such that optimum container sizes can be obtained. Even when data in different amounts are inserted, optimum container sizes corresponding to the data can be calculated. As a result, an optimum layout can be provided to the user.

Other Embodiment

The object of the present invention can also be achieved by supplying a storage medium which stores software program codes for implementing the functions of the above-described embodiments to a system or apparatus and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program codes, for example, a flexible disk, hard disk, optical disk, magnetooptical disk, CD-ROM, CD-R, magnetic tape, nonvolatile memory card, ROM, or the like can be used.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-024487 filed on Jan. 30, 2004, which is hereby incorporated by reference herein.

What is claimed is:

1. A layout adjustment method of determining a layout of a page, comprising:
   a layout step of laying-out a plurality of partial regions in which content data is inserted in the page;
   a link setting step of setting, between two partial regions of the partial regions laid-out in the layout step, a link to which a flexible range and a reference size of a distance between the two partial regions are set;

a deciding step of deciding a size of each of the two partial regions on the basis of the content data to be inserted in each of the two partial regions;

a determination step of determining whether the total size of (1) the size of a predetermined direction of the two partial regions having the size decided in the deciding step and (2) the reference size of the link, falls within a size of the predetermined direction of a region for laying-out the two partial regions laid-out in the layout step; and an adjustment step of, when the determination step determines that the total size of (1) the size of the predetermined direction of the two partial regions having the size decided in the deciding step and (2) the reference size of the link, does not fall within the size of the predetermined direction of the region for laying-out the two partial regions, shrinking the distance between the two partial regions within the flexible range of the link set in the link setting step and changing the size decided in the deciding step.

2. The method according to claim 1, wherein adjustment step shrinks the distance between the two partial regions before changing the size decided in the deciding step on the basis of priority which is set for each of the partial regions and the link indicating the distance between the partial regions.

3. The method according to claim 1, further comprising a display step of causing a display device to display the layout on the page including a result of adjustment in the adjustment step by specifying a data group containing data corresponding to each partial region.

4. The method according to claim 1, further comprising an identification display step of causing a display device to display graphic patterns which represent the partial regions and the link set between the partial regions and display the link for which the flexible range is set in the link setting step distinguishably from another link.

5. A layout adjustment apparatus for determining a layout of a page, comprising:

a layout unit configured to lay-out a plurality of partial regions in which content data is inserted, in the page;

a link setting unit configured to set, between two partial regions of the partial regions laid-out by the layout unit, a link to which a flexible range and a reference size of a distance between the two partial regions are set;

a deciding unit configured to decide a size of each of the two partial regions on the basis of the content data to be inserted in each of the two partial regions;

a determining unit configured to determine whether the total size of (1) the size of a predetermined direction of the two partial regions having the size decided by the deciding unit and (2) the reference size of the link, falls within a size of the predetermined direction of a region for laying-out the two partial regions laid-out by the layout unit; and an adjustment unit configured to, when the determining unit determines that the total size of the size of (1) the predetermined direction of the two partial regions having the size decided by the deciding unit and (2) the reference size of the link, does not fall within the size of the predetermined direction of the region for laying-out the two partial regions, shrinking the distance between the two partial regions within the flexible range of the link set by said link setting unit and changing the size decided by the deciding unit.

6. The apparatus according to claim 5, wherein said adjustment unit shrinks the distance between the partial regions before changing the size decided by the deciding unit on the basis of priority which is set for each of the partial regions and the link indicating the distance between the partial regions.

7. The apparatus according to claim 5, further comprising a display unit for causing a display device to display the layout on the page including a result of adjustment by said adjustment unit by specifying a data group containing data corresponding to each partial region.

8. The apparatus according to claim 5, further comprising an identification display unit configured to cause a display device to display graphic patterns which represent the partial regions and the link set between the partial regions and display the link for which the flexible range is set by said link setting unit distinguishably from another link.

9. A control program which causes a computer to execute layout adjustment processing for determining a layout of a page, the layout adjustment processing comprising:

a layout step of laying-out a plurality of partial regions in which content data is inserted in the page;

a link setting step of setting, between partial regions of the partial regions laid-out in the layout step, a link to which a flexible range and a reference size of a distance between the two partial regions are set;

a deciding step of deciding a size of each of the two partial regions on the basis of the content data to be inserted in each of the two partial regions;

a determination step of determining whether the total size of (1) the size of a predetermined direction of the two partial regions having the size decided in the deciding step and (2) the reference size of the link, falls within a size of the predetermined direction of a region for laying-out the two partial regions laid-out in the layout step; and an adjustment step of, when the determination step determines that (1) the total size of the size of the predetermined direction of the two partial regions having the size calculated in the deciding step and (2) the reference size of the link, does not fall within the sizes of the predetermined direction of the region for laying-out the two partial regions, shrinking the distance between the two partial regions within the flexible range of the link set in the link setting step and changing the size decided in the deciding step.

10. The program according to claim 9, wherein the adjustment step shrinks the distance between the two partial regions before changing the size decided in the deciding step on the basis of priority which is set for each of the partial regions and the link indicating the distance between the partial regions.

11. The program according to claim 9, further comprising a display step of causing a display device to display the layout on the page including a result of adjustment in the adjustment step by specifying a data group containing data corresponding to each partial region.

12. The program according to claim 9, further comprising an identification display step of causing a display device to display graphic patterns which represent the partial regions and the link set between the partial regions and display the link for which the flexible range is set in the link setting step distinguishably from another link.

* * * * *